US009908432B2

United States Patent
Park et al.

(10) Patent No.: US 9,908,432 B2
(45) Date of Patent: Mar. 6, 2018

(54) ROBOT CLEANER AND CONTROL METHOD THEREOF

(71) Applicant: SAMSUNG ELECTRONICS CO., LTD., Suwon-si, Gyeonggi-do (KR)

(72) Inventors: Sung Jin Park, Suwon-si (KR); Dong Hun Lee, Ansan-si (KR); Heum Yong Park, Suwon-si (KR); Dong-Hyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/057,432

(22) Filed: Mar. 1, 2016

(65) Prior Publication Data

US 2016/0259336 A1    Sep. 8, 2016

(30) Foreign Application Priority Data

Mar. 5, 2015  (KR) .......................... 10-2015-0030706

(51) Int. Cl.
*B60L 15/20* (2006.01)
*B60G 17/016* (2006.01)
(Continued)

(52) U.S. Cl.
CPC ............. *B60L 15/20* (2013.01); *A47L 9/2831* (2013.01); *A47L 11/40* (2013.01); *B60G 17/016* (2013.01);
(Continued)

(58) Field of Classification Search
CPC ........ B60L 15/20; G05D 1/02; B60G 17/0195
(Continued)

(56) References Cited

U.S. PATENT DOCUMENTS 7,275,280 B2 * 10/2007 Haegermarck ......... A47L 9/009
15/319
7,591,282 B1 * 9/2009 Achterman ............. F16K 17/30
137/460
(Continued)

FOREIGN PATENT DOCUMENTS

EP          2 756 787 A1    7/2014
KR      10-2014-0067705    6/2014
WO      WO 2015/084078 A1  6/2015

OTHER PUBLICATIONS

Extended European Search Report dated Nov. 3, 2016 in corresponding European Patent Application No. 16158360.4.
(Continued)

*Primary Examiner* — Tan Q Nguyen
(74) *Attorney, Agent, or Firm* — Staas & Halsey LLP

(57) ABSTRACT

Proposed are a robot cleaner having an improved wheel structure to escape from being stuck in various travel conditions, and a control method thereof. The robot cleaner may smoothly escape from a door sill or an obstacle to stably travel irrespective of a state of a floor by providing an optimal frictional force of the floor through the control of an electric current of a motor when the robot cleaner escapes from being stuck. Also, the robot cleaner may stably travel without shaking by controlling an electric current flowing through the motor after the robot cleaner escapes from being stuck and before the driving wheel returns to a normal mode. Furthermore, it is possible to prevent a wheel mechanism such as a gear from being damaged by an external shock (e.g., which is caused by a pet or an object drop) or a shock caused by autonomous vibration when the robot cleaner crosses over an obstacle.

14 Claims, 31 Drawing Sheets

(51) Int. Cl.
*B60G 17/019* (2006.01)
*A47L 9/28* (2006.01)
*A47L 11/40* (2006.01)
*G05D 1/02* (2006.01)

(52) U.S. Cl.
CPC ........ *B60G 17/019* (2013.01); *A47L 2201/00* (2013.01); *Y02T 10/7258* (2013.01)

(58) Field of Classification Search
USPC .......................................................... 701/23
See application file for complete search history.

(56) References Cited

U.S. PATENT DOCUMENTS

| | | | |
|---|---|---|---|
| 8,370,990 B2* | 2/2013 | Yu .................. | B62D 57/024 |
| | | | 15/319 |
| 2008/0143063 A1 | 6/2008 | Won | |
| 2012/0090126 A1* | 4/2012 | Kim .................. | A47L 9/009 |
| | | | 15/319 |
| 2013/0340201 A1* | 12/2013 | Jang .................. | A47L 9/009 |
| | | | 15/319 |
| 2015/0150429 A1 | 6/2015 | Yoo et al. | |
| 2016/0051103 A1* | 2/2016 | Jang .................. | A47L 5/28 |
| | | | 15/329 |

OTHER PUBLICATIONS

European Office Action dated Jul. 31, 2017, in corresponding European Patent Application No. 16 158 360.4.

* cited by examiner

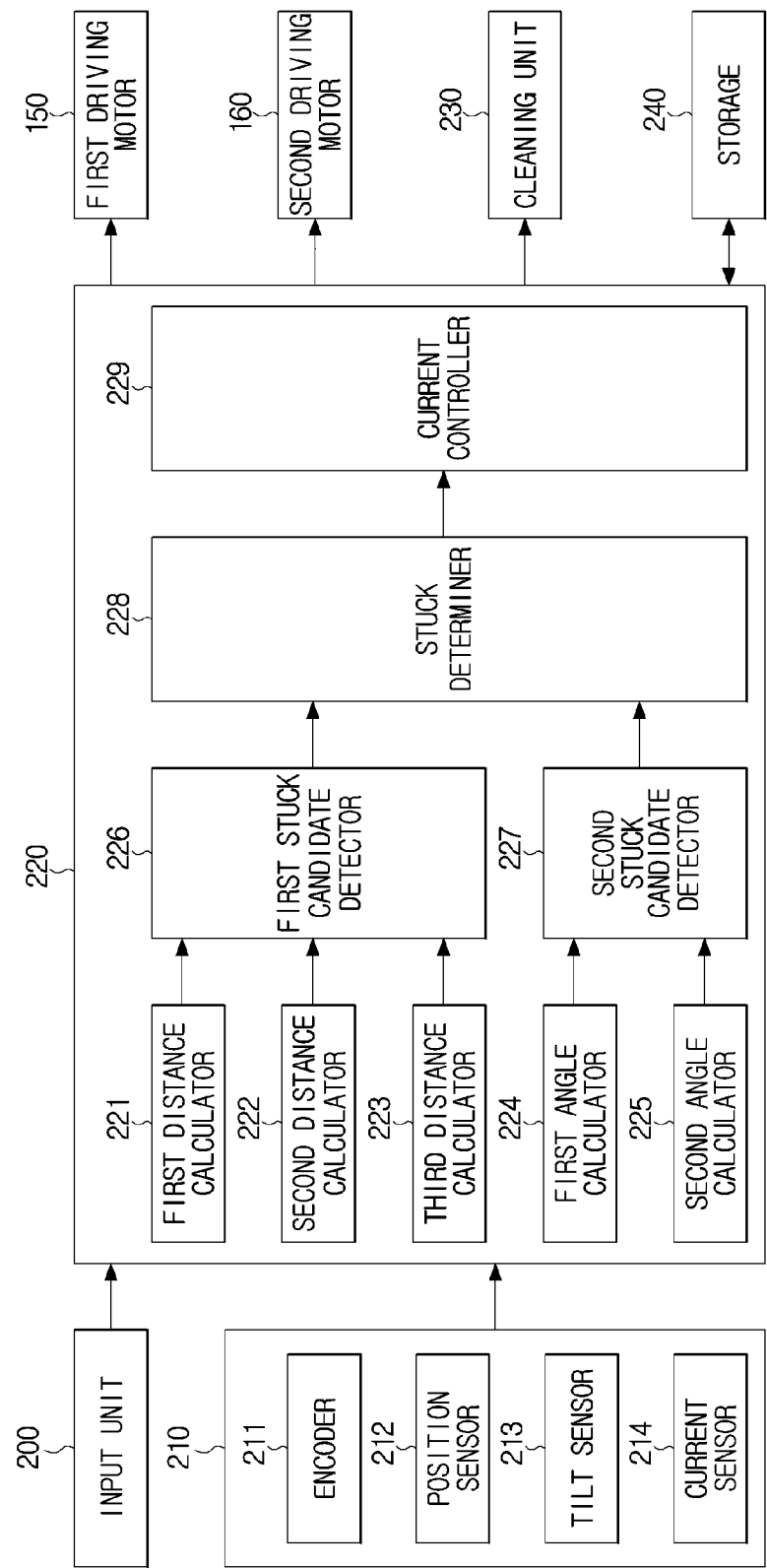

ROBOT CLEANER AND CONTROL METHOD THEREOF

CROSS-REFERENCE TO RELATED APPLICATION

This application claims the benefit of Korean Patent Application No. 2015-0030706, filed on Mar. 5, 2015 in the Korean Intellectual Property Office, the disclosure of which is incorporated herein by reference.

BACKGROUND

1. Field

Embodiments of the present disclosure relate to a robot cleaner with an improved travel performance and a control method thereof.

2. Description of the Related Art

In general, a robot cleaner is a device that automatically cleans a region desired to be cleaned without a user's manipulation by sucking up foreign substances such as dust from floors while autonomously travelling in the region.

Such a robot cleaner has a pair of driving wheels installed in both sides of a lower part of its main body and includes one or more casters needed to support the main body in order to turn or move the main body forward or backward in a cleaning region. There are obstacles such as an edge protrusion (a door sill), an object having an inclined surface, and furniture in the cleaning region in which the robot cleaner travels.

A robot having a low main body, such as a robot cleaner, may be caught at an upper portion when entering a narrow gap of an obstacle (e.g., going below a bed or couch), and may be lifted at a driving wheel while the robot cleaner crosses over an obstacle (e.g., a structure or groove in a floor). That is, the robot cleaner may be stuck and immobile.

When only one wheel is in contact with the floor because the robot cleaner is lifted, a conventional robot cleaner applies a suspension that uses a spring to allow a floating wheel, that is, an idling wheel, to protrude in order to secure a frictional force.

However, since the related art robot cleaner depends on the force of the spring, the robot cleaner cannot obtain a sufficient frictional force when its wheel is lifted. In addition, since the wheel is lifted high irrespective of the height of the obstacle, a wheel mechanism such as a gear may be damaged by an external shock (e.g., which is caused by a pet or an object drop) or a shock caused by autonomous vibration when the robot cleaner crosses over the obstacle. Furthermore, since the robot cleaner crosses over the obstacle while its wheel is inappropriately lifted high, the robot cleaner may be rattled and also cannot travel naturally.

SUMMARY

Therefore, it is an aspect of the present disclosure to provide a robot cleaner having an improved wheel structure to escape from being stuck in various travel conditions, and a control method thereof.

Another aspect of the present disclosure provides a robot cleaner that may naturally escape from being stuck by providing an optimal frictional force of a floor through the control of an electric current of a motor when the robot cleaner escapes from being stuck.

Still another aspect of the present disclosure provides a robot cleaner that may stably travel without shaking by controlling an electric current flowing through the motor after the robot cleaner escapes from being stuck and before the driving wheel returns to a normal mode.

Additional aspects of the disclosure will be set forth in part in the description which follows and, in part, will be obvious from the description, or may be learned by practice of the disclosure.

In accordance with one aspect of the present disclosure, a robot cleaner includes a main body; and a driving unit configured to move the main body. The driving unit includes a plurality of motors configured to generate driving forces; a driving wheel configured to rotate when receiving a driving force transferred from any one of the plurality of motors; and a wheel frame configured to rotatably support the driving wheel and configured to rotate to change a position of the driving wheel when receiving a driving force transferred from another one of the plurality of the motors.

The plurality of motors may include a first driving motor configured to rotate the driving wheel; and a second driving motor configured to rotate the wheel frame.

The robot cleaner may further include a current sensor configured to measure an electric current flowing through the second driving motor and detect whether the driving wheel is in contact with a floor when the wheel frame rotates.

The robot cleaner may further include a housing configured to fix the first driving motor and the second driving motor; and an elastic member disposed between the housing and the wheel frame. The wheel frame is pressed by the elastic member to rotate while not receiving a diving force transferred from the second driving motor.

The wheel frame may rotate between a first position and a second position with respect to a motor shaft of the first driving motor when receiving the driving force transferred from the second driving motor.

The wheel frame may rotate between the first position and a third position placed between the first position and the second position when the wheel frame is pressed by the elastic member, and may rotate between the third position and the second position when the wheel frame receives the driving force transferred from the second driving motor.

The driving unit may include at least one first driving force transfer gear accommodated inside the wheel frame and configured to transfer a driving force of the first driving motor to the driving wheel; and at least one second driving force transfer gear disposed between the second driving motor and the wheel frame and configured to transfer the driving force of the second driving motor to the wheel frame.

In accordance with another aspect of the present disclosure, a robot cleaner includes a main body; a driving unit configured to move the main body, the driving unit including a driving wheel, a wheel frame configured to rotatably support the driving wheel, a first driving motor configured to generate a driving force for rotating the driving wheel, and a second driving motor configured to generate a driving force for rotating the wheel frame; an input unit configured to receive a command of the robot cleaner; a current sensor configured to measure an electric current flowing through the second driving motor when the robot cleaner travels according to the received command; and a controller configured to determine whether the robot cleaner is stuck using the electric current measured by the current sensor and control an output of the second driving motor so that the robot cleaner escapes from being stuck when the robot cleaner is determined as being stuck.

The driving unit may further include an elastic member configured to press the wheel frame, and the elastic member and the second driving motor may independently rotate the wheel frame.

The controller may detect a traction force between the driving wheel and a floor using the electric current measured by the current sensor when the wheel frame rotates.

The controller may determine that the robot cleaner is lifted and thus stuck when the electric current measured by the current sensor decreases to below a certain electric current.

The controller may increase the output of the second driving motor to rotate the wheel frame between a third position and a second position when the robot cleaner is lifted and thus stuck.

The controller may change a position of the driving wheel between a first drop position and a second drop position when the wheel frame rotates between the third position and the second position.

The controller may determine that the driving wheel is in contact with the floor when the electric current measured by the current sensor increases to above a certain electric current.

The controller may stop driving the second driving motor when the driving wheel is in contact with the floor.

The robot cleaner may further include an encoder configured to measure a movement of the driving unit that moves according to the received command; and a position sensor configured to measure a movement of the robot cleaner. The controller determines a travel state of the robot cleaner using a position value obtained by the received command, a position value obtained by calculating a movement position of the robot cleaner according to the measured value of the encoder, and a position value obtained by calculating a movement position of the robot cleaner according to sensor information of the robot cleaner.

The encoder may be installed in the first driving motor and configured to measure a movement amount of the first driving motor generated by the command of the robot cleaner.

The position sensor may be an optical flow sensor configured to measure an actual movement distance of the robot cleaner.

The robot cleaner may further include a tilt sensor configured to measure a tilt of the robot cleaner. The controller may calculate a movement angle of the robot cleaner according to the measured value of the encoder, measures a movement angle of the robot cleaner according to sensor information of the tilt sensor, and determines the travel state of the robot cleaner using the calculated angle of the robot cleaner and the measured angle of the robot cleaner.

The controller may detects a difference between the calculated position or angle of the robot cleaner and the measured position or angle of the robot cleaner during a certain time to determine whether the robot cleaner is stuck and immobile.

In accordance with still another aspect of the present disclosure, a control method of a robot cleaner including a main body and a driving unit, the driving unit including a driving wheel, a wheel frame configured to rotatably support the driving wheel, a first driving motor configured to generate a driving force for rotating the driving wheel, and a second driving motor configured to generate a driving force for rotating the wheel frame includes: measuring, by a current sensor, an electric current flowing through the second driving motor when the robot cleaner travels according to a received command; determining whether the robot cleaner is stuck using the measured electric current; and escaping from being stuck by increasing an output of the second driving motor when the robot cleaner is determined as being stuck.

The determining whether the robot cleaner is stuck may include determining that the robot cleaner is lifted and thus stuck when the electric current flowing through the second driving motor decreases to below a certain electric current.

The escaping from being stuck may include lowering the driving wheel to the floor by increasing the output of the second driving motor until the electric current flowing through the second driving motor reaches a certain electric current.

The control method may further include determining that the driving wheel is in contact with the floor and stopping a driving of the second driving motor when the electric current flowing through the second driving motor increases to above the certain electric current.

The control method may further include measuring a movement of the driving unit that moves according to the received command and calculating a movement position or angle of the robot cleaner by an encoder; measuring a movement of the robot cleaner through a position sensor and a tilt sensor; and determining a travel state of the robot cleaner using the calculated angle or position of the robot cleaner and the measured angle or position of the robot cleaner.

The determining of the travel state of the robot cleaner may include detecting a difference between the calculated position or angle of the robot cleaner and the measured position or angle of the robot cleaner during a certain time to determine whether the robot cleaner is stuck and immobile.

In accordance with yet another aspect of the present disclosure, a wheel frame installed in a robot cleaner and configured to rotatably support a driving wheel of the robot cleaner includes: a gear accommodation part provided inside the wheel frame; and first driving force transfer gears accommodated in the gear accommodation part and configured to transfer a driving force of a first driving motor for rotating the driving wheel to the driving wheel.

The wheel frame may further include second driving force transfer gears configured to transfer a driving force of a second driving motor for rotating the wheel frame to the wheel frame; and a support frame configured to rotatably support the second driving force transfer gears.

The wheel frame may further include a driving wheel provided outside the wheel frame and configured to receive the driving force transferred from the second driving force transfer gears.

The second driving force transfer gears may include a motor shaft gear configured to engage with a motor shaft of the second driving motor; a tilt gear disposed to engage with a driving gear; and at least one connection gear disposed between the motor shaft gear and the tilt gear and configured to transfer a driving force.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a control block diagram showing a robot cleaner that determines that the robot cleaner is stuck and escapes from being stuck according to an embodiment of the present disclosure;

DETAILED DESCRIPTION

Figure 1:
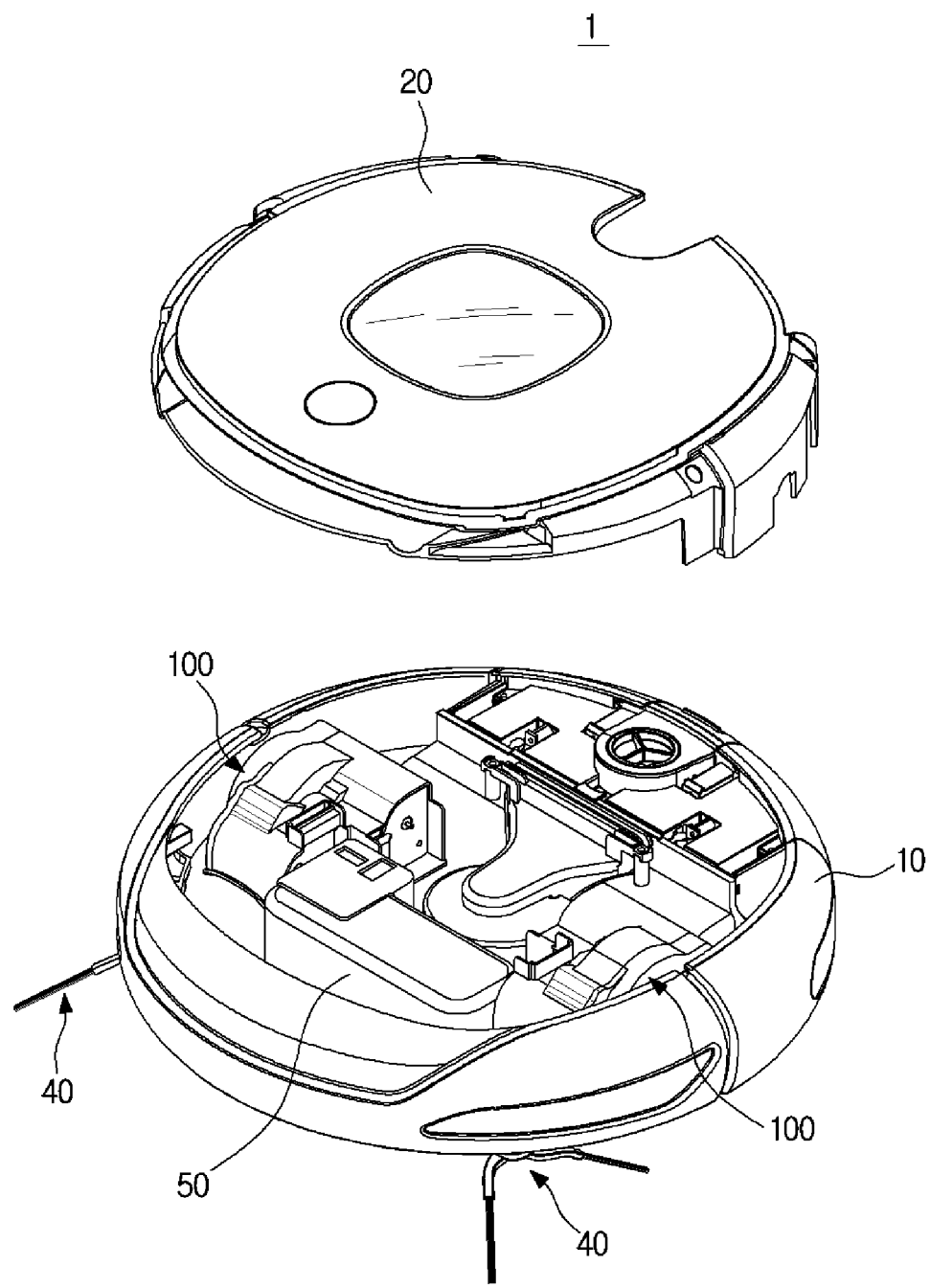
FIG. 1 is a view showing a configuration of a robot cleaner according to an embodiment of the present disclosure.

Reference will now be made in detail to the embodiments of the present disclosure, examples of which are illustrated in the accompanying drawings, wherein like reference numerals refer to like elements throughout.

Figure 2:
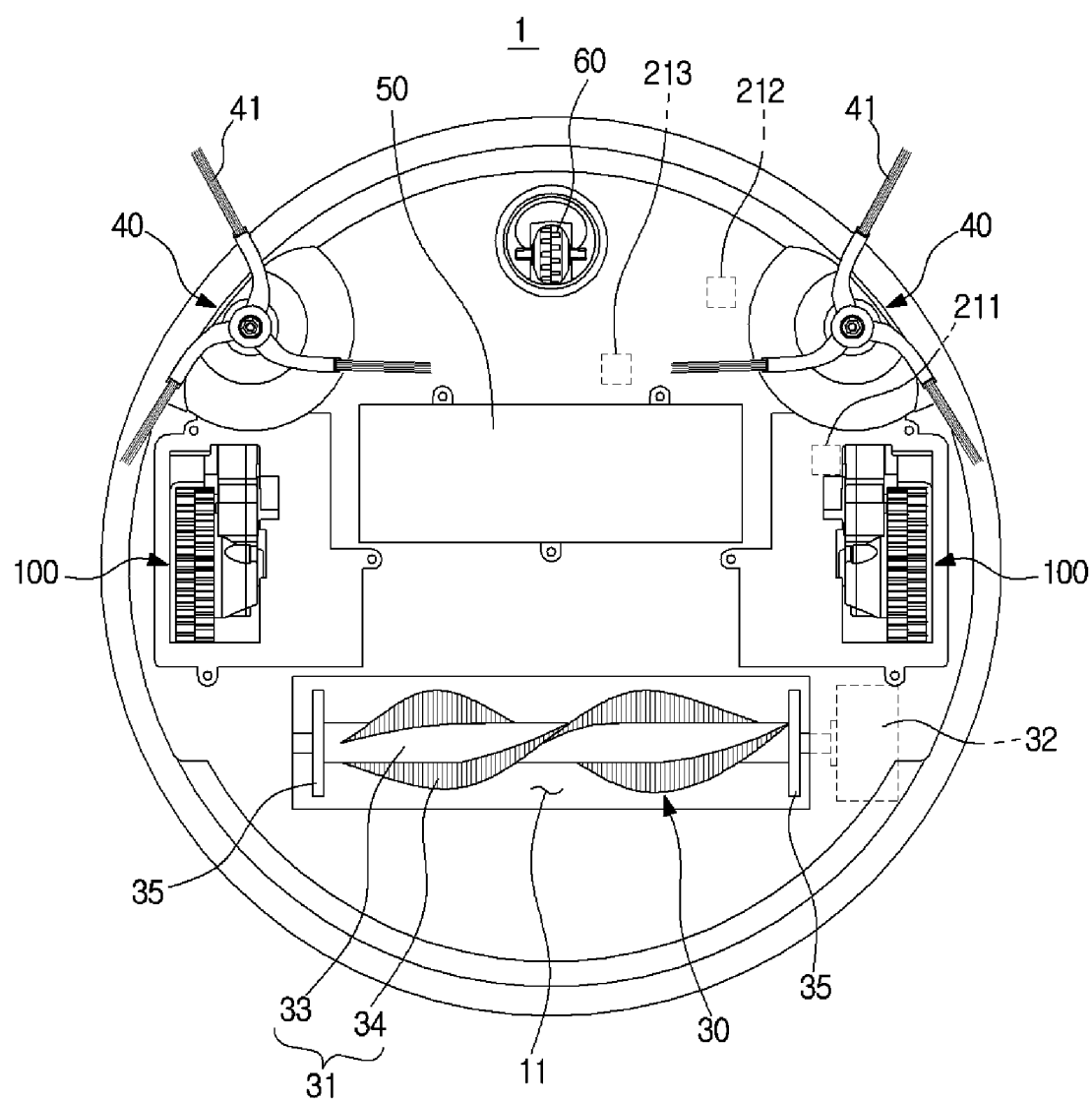
FIG. 2 is a bottom view of a robot cleaner according to an embodiment of the present disclosure.

FIG. 1 is a view showing a configuration of a robot cleaner according to an embodiment of the present disclosure, and FIG. 2 is a bottom view of a robot cleaner according to an embodiment of the present disclosure.

Referring to FIGS. 1 and 2, a robot cleaner 1 according to an embodiment of the present disclosure includes a main body 10 forming an external appearance of the robot cleaner 1, a cover 20 configured to cover a top of the main body 10, brushers 30 and 40 configured to sweep or scatter dust in a cleaning space, a power source 50 configured to supply driving power to drive the main body 10, and a driving unit 100 configured to drive the main body 10.

The main body 10 supports various kinds of components installed therein in addition to forming the exterior of the robot cleaner 1.

The brushers 30 and 40 include a main brusher 30 installed in an intake port 11 formed below the main body 10 and configured to sweep or scatter dust on a floor in order to enhance intake efficiency of the dust and a side brusher 40 installed in both lower portions of the front of the main body 10 and configured to sweep the dust on the floor in toward the intake port 11 while the robot cleaner 1 is traveling.

The main brusher 30 includes a brush unit 31 having the shape of a drum that rotates like a roller with respect to a floor in order to sweep or scatter dust on the floor and a brush motor 32 for rotating the brush unit 31.

The brush unit 31 includes a roller 33 and a brush 34. The roller 33 is formed of a rigid body. The roller 33 is rotatably coupled to the main body 10 and driven by the brush motor 32. An end cap 35 is installed on both ends of the roller 33 to prevent foreign substances from moving to the brush motor 32. The brush 34 is made of an elastic material and fixed at the roller 33. While the robot cleaner 1 is traveling, the brush 34 mixes dust or foreign substances accumulated on the floor along with the roller 33.

The side brusher 40 includes brushes 41 installed at a certain distance on both sides of the front of the main body 10 and configured to rotate horizontally with the floor in order to sweep dust on the floor that is not swept by the main brusher 30 into the intake port 11.

The power source 50 includes a battery electrically connected with a first driving motor 150 (see FIG. 3) and a second driving motor 160 (see FIG. 3) of the driving unit 100, the brush motor 32 for rotating the main brusher 30, and a driver for driving the main body 10 in order to supply driving power thereto. A rechargeable secondary battery is provided as the battery. When the main body 10 finishes a cleaning work and couples to a docking station (not shown), the battery is charged with power supplied from the docking station (not shown).

In addition, a caster wheel 60 having a rotation angle changed according to the state of the floor on which the robot cleaner 1 travels is installed at the front of the main body 10. The caster wheel 60 is utilized to stabilize a posture of the robot cleaner 1 and prevent the robot cleaner 1 from falling in order to support the robot cleaner 1. The caster wheel 60 is configured as a wheel having the shape of a roller or a caster.

In an embodiment of the present disclosure, an example in which the caster wheel 60 is installed in the front of the main body 10 has been described. However, the present disclosure is not limited thereto, and the caster wheel 60 may be installed on the rear of the main body 10 or the front and the rear of the main body 10 in order to achieve the same objective and effect as described in the present disclosure.

The driving unit 100 is each provided at both sides of the center of the main body 10 and enables movement operations such as a forward movement, a backward movement, and a turning movement while the main body 10 performs cleaning.

Left and right driving units 100 may allow the robot cleaner 1 to move forward or backward or turn by rotating in a forward direction or a reverse direction according to a command of a controller 220 (see FIG. 8), which will be described below. For example, the robot cleaner 1 may travel forward or backward by rotating the left and right driving units 100 in a forward direction or reverse direction. The robot cleaner 1 may turn left from the front by rotating the right driving unit 100 in the forward direction while rotating the left driving unit 100 in the reverse direction. The robot cleaner 1 may turn right from the front by rotating the left driving unit 100 in the forward direction while rotating the right driving unit 100 in the reverse direction.

The driving unit 100 positioned to the right with respect to the forward direction of the main body 10 will be described below as an example. The following description may be applied to the driving unit 100 positioned to the left with respect to the forward direction of the main body unless specially stated otherwise. The driving unit 100 will be described below in detail with reference to FIGS. 3 to 5.

An encoder 211 for measuring a movement amount of the driving unit 100 that is driven according a motion command of a user, a position sensor 212 for measuring an actual movement amount of the robot cleaner 1, and a tilt sensor 213 are installed in the main body 10. The encoder 211, the position sensor 212, and the tilt sensor 213 will be described below in detail with reference to FIG. 8.

Additionally, a contact sensor and a proximity sensor for detecting an obstacle may be installed in the main body 10. For example, a bumper (not shown) installed in the front of the main body 10 may be used to detect an obstacle such as a wall, and an infrared sensor (or an ultrasonic sensor) installed at a floor of the main body 10 may be used to detect an obstacle such as a stairway.

Figure 3:
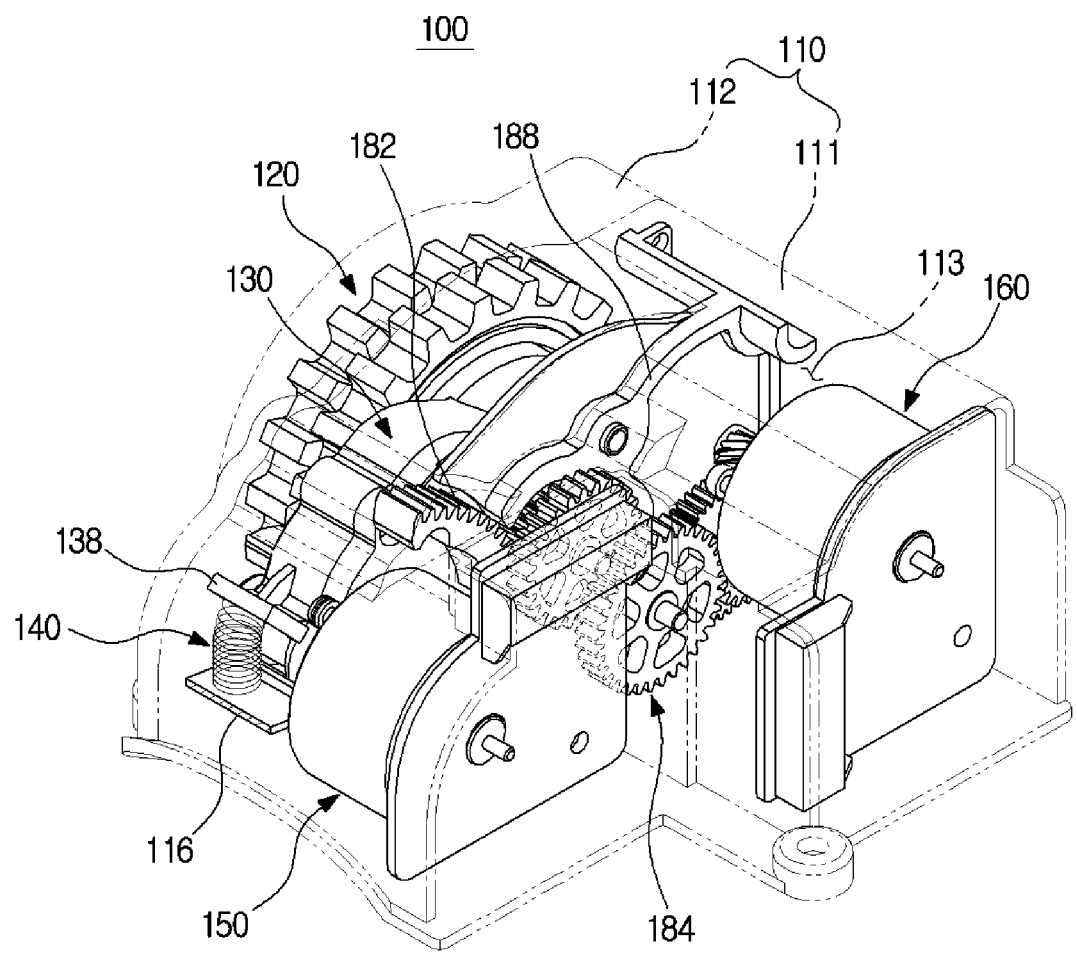
FIG. 3 is a perspective view of a driving unit according to an embodiment of the present disclosure.
Figure 4:
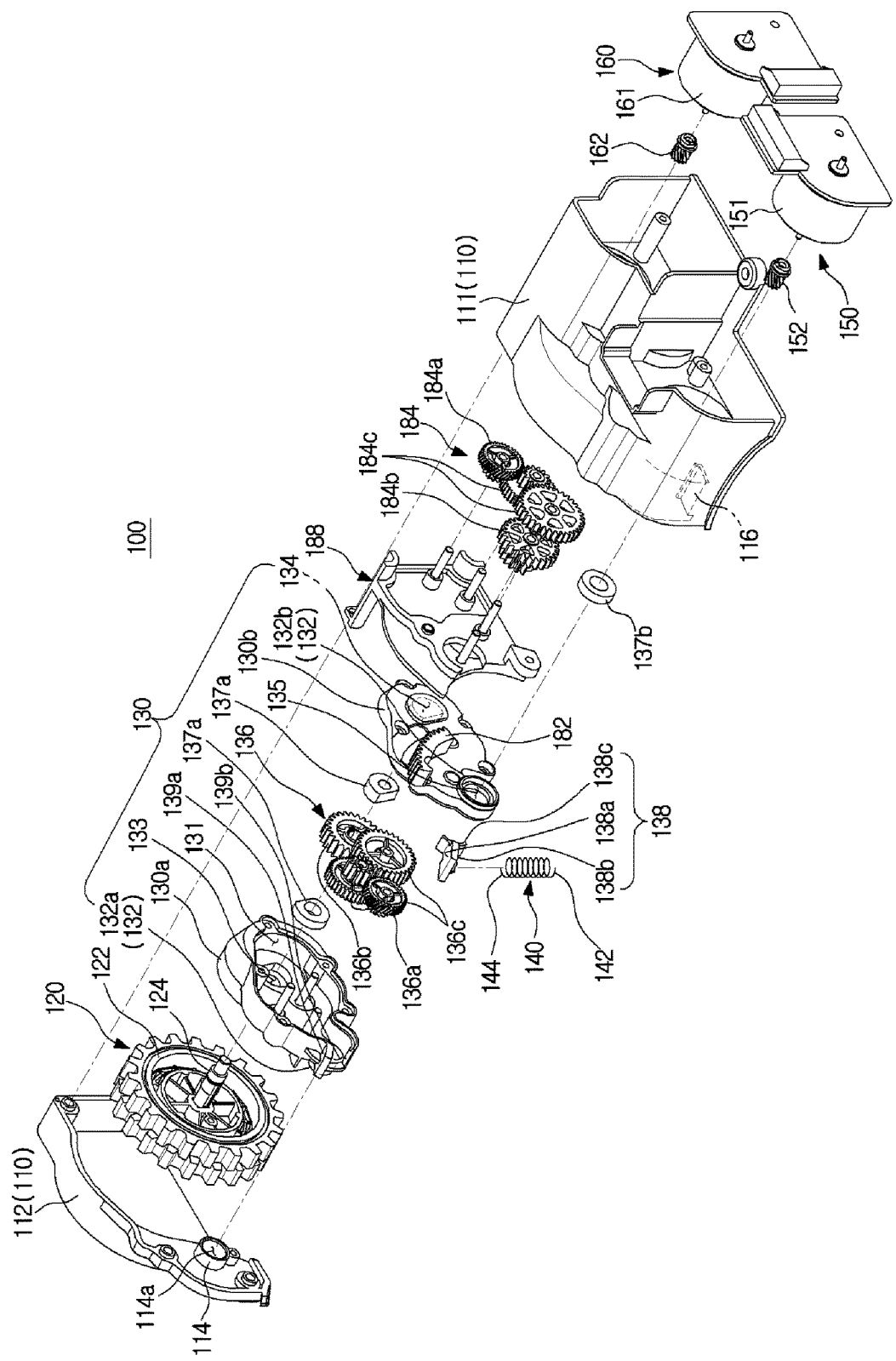
FIG. 4 is an exploded perspective view of a driving unit according to an embodiment of the present disclosure.
Figure 5:
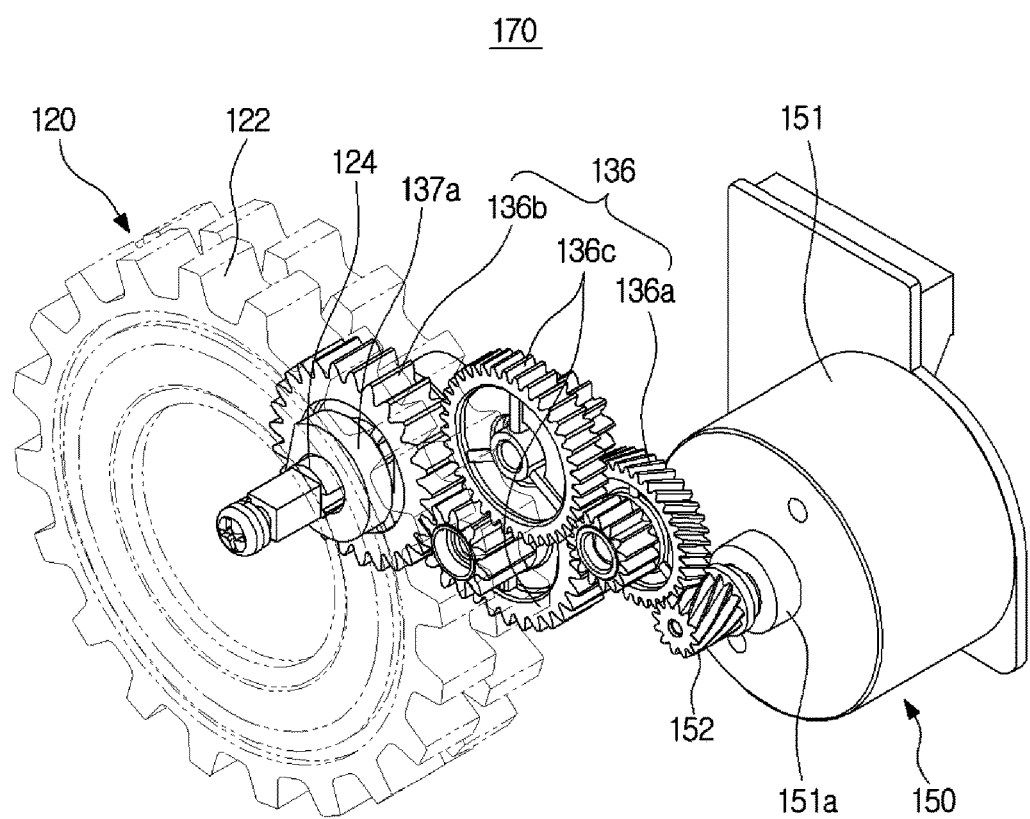
FIG. 5 is a perspective view of a wheel driver shown in FIG. 3.
Figure 6:
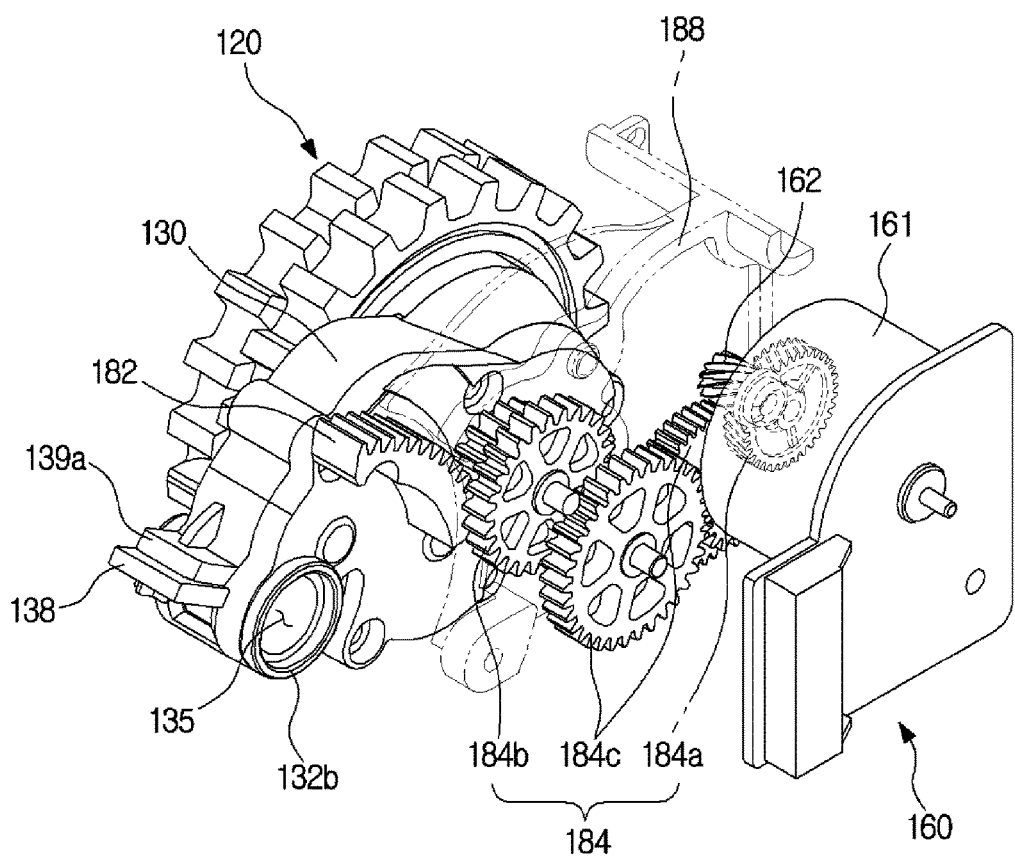
FIG. 6 is a perspective view showing a wheel frame driver shown in FIG. 3.

FIG. 3 is a perspective view of a driving unit according to an embodiment of the present disclosure, FIG. 4 is an exploded perspective view of a driving unit according to an embodiment of the present disclosure, FIG. 5 is a perspective view of a wheel driver shown in FIG. 3, and FIG. 6 is a perspective view showing a wheel frame driver shown in FIG. 3.

Referring to FIGS. 3 to 6, a driving unit 100 includes a housing 110, a driving wheel 120 configured to drive a main body 10, a wheel frame 130 configured to rotatably support the driving wheel 120, an elastic member 140 configured to press the wheel frame 130, a first driving motor 150 configured to generate a driving force for rotating the driving wheel 120, and a second driving motor 160 configured to generate a driving force for rotating the wheel frame 130.

The housing 110 includes a housing body 111, a housing cover 112 coupled with a side of the housing body 111, an accommodation part 113 formed by the housing body 111 and the housing cover 112, a support protrusion 114 configured to rotatably support the wheel frame 130, a first support rib 116 configured to support one end of the elastic member 140, and a stopper 118 (see FIG. 7A) configured to limit the rotation of a holder 138.

The housing 110 has an open bottom so that the driving wheel 120 and the wheel frame 130 may move up or down depending on the type and state of the floor in the cleaning space.

The accommodation part 113 accommodates the driving wheel 120, the wheel frame 130, the elastic member 140, the first driving motor 150, the second driving motor 160, and so on.

The support protrusion 114 protrudes from the interior of the housing cover 112 toward the accommodation part 113. An accommodation hole 114a configured to accommodate a first rotating shaft 132a of the wheel frame 130 is provided at the center of the support protrusion 114 so that the wheel frame 130 may rotate about the support protrusion 114.

The first support rib 116 protrudes from the interior of the housing body 111 toward the accommodation part 113 to support one end of the elastic member 140.

The stopper 118 is formed inside the housing body 111 to limit the rotation of the holder 138.

The driving wheel 120 includes a wheel 122 that is in direct contact with the floor in the cleaning space to enable the main body 10 to travel and a driving shaft 124 fixed to the wheel 122 to drive and rotate the wheel 122. The driving shaft 124 passes through the wheel frame 130 and is rotatably coupled to the wheel frame 130. A driving shaft gear 136b among first driving force transfer gears 136 is fixed to the driving shaft 124. The driving shaft 124 is a rotation center C2 (see FIG. 7A) of the driving wheel 120.

The wheel frame 130 includes a first frame 130a and a second frame 130b that are coupled to form a gear accommodation part 131, a frame rotating shaft 132 protruding from an outer surface of each of the first frame 130a and the second frame 130b, and the first driving force transfer gears 136 accommodated by the gear accommodation part 131 to transfer the driving force of the first driving motor 150 to the driving wheel 120.

A first through-hole 133 is provided in the first frame 130a so that the driving shaft 124 may be accommodated by the gear accommodation part 131 through the first through-hole 133. A support hole 134 is provided inside the second frame 130b to accommodate a bearing 137a that is coupled to one end of the driving shaft 124 accommodated by the gear accommodation part 131 and is configured to rotatably support the driving shaft 124. The bearing 137a that rotatably supports the driving shaft 124 may be inserted into the first through-hole 133 and the support hole 134. A second through-hole 135 is provided in the second frame 130b so that a motor shaft 152 of the first driving motor 150 may be accommodated by the gear accommodation part 131 through the second through-hole 135.

The frame rotating shaft 132 includes the first rotating shaft 132a protruding from the outer surface of the first frame 130a and a second rotating shaft 132b protruding from the outer surface of the second frame 130b in a direction opposite to that of the first rotating shaft 132a. The first rotating shaft 132a and the second rotating shaft 132b are coaxial. The first rotating shaft 132a is rotatably accommodated by the accommodation hole 114a of the support protrusion 114. The second rotating shaft 132b may accommodate a support shaft 151a protruding from a motor housing 151 of the first driving motor 150. The bearing 137b may be inserted between the second rotating shaft 132b and the support shaft 151a to rotatably support the second rotating shaft 132b.

The first driving force transfer gears 136 includes a motor shaft gear 136a engaging with the motor shaft 152 of the first driving motor 150, a driving shaft gear 136b fixed to the driving shaft 124 of the driving wheel 120, and a plurality of connection gears 184c configured connect the motor shaft gear 136a and the driving shaft gear 136b. A rotational speed of the motor shaft 152 decreases after the first driving force transfer gears 136.

In addition, the wheel frame 130 includes the holder 138 configured to support the elastic member 140 along with the first support rib 116, a second support rib 139a configured to protrude from the outer surface of each of the first frame 130a and the second frame 130b and support the holder 138, and a guide hole 139b configured to guide the rotation of the holder 138.

The holder 138 includes a rotator 138a rotatably coupled to the guide hole 139b, a supporter 138b configured to protrude from the rotator 138a in a direction of a radius of the rotator 138a and support the elastic member 140, and an escape preventer 138c accommodated inside the wheel frame 130 and configured to prevent the rotator 138a from escaping.

The supporter 138b is pressed by the elastic member 140 to the degree that the elastic member 140 can be extended. The supporter 138b pressed by the elastic member 140 rotates the wheel frame by pressing the second support rib 139a while in contact with the second support rib 139a. That is, a tensile force of the elastic member 140 is transferred to the wheel frame 130 through the supporter 138b of the holder 138 and the second support rib 139a of the wheel frame 130 in order to rotate the wheel frame 130. On the other hand, an impact transferred through the driving wheel 120 while the main body 10 is traveling is transferred to the elastic member 140 through the wheel frame 130, the second support rib 139a of the wheel frame 130, and the supporter 138b of the holder 138.

A driving gear 182 is provided on the outer surface of the second frame 130b. The driving gear 182 may protrude from the outer surface of the second frame 130b and may be formed integrally with the second frame 130b. The driving force generated by the second driving motor 160 rotates the wheel frame 130 through second driving force transfer gears 184 and the driving gear 182.

The elastic member 140 is configured as a compressive coil spring and disposed between the first support rib 116 of the housing 110 and the supporter 138b of the holder 138 to press the wheel frame 130 in one direction.

The elastic member 140 includes a fixed end 142 that is fixedly supported by the first support rib 116 and a pressing end 144 that is fixedly supported by the supporter 138b to press the holder 138.

Figure 7A:
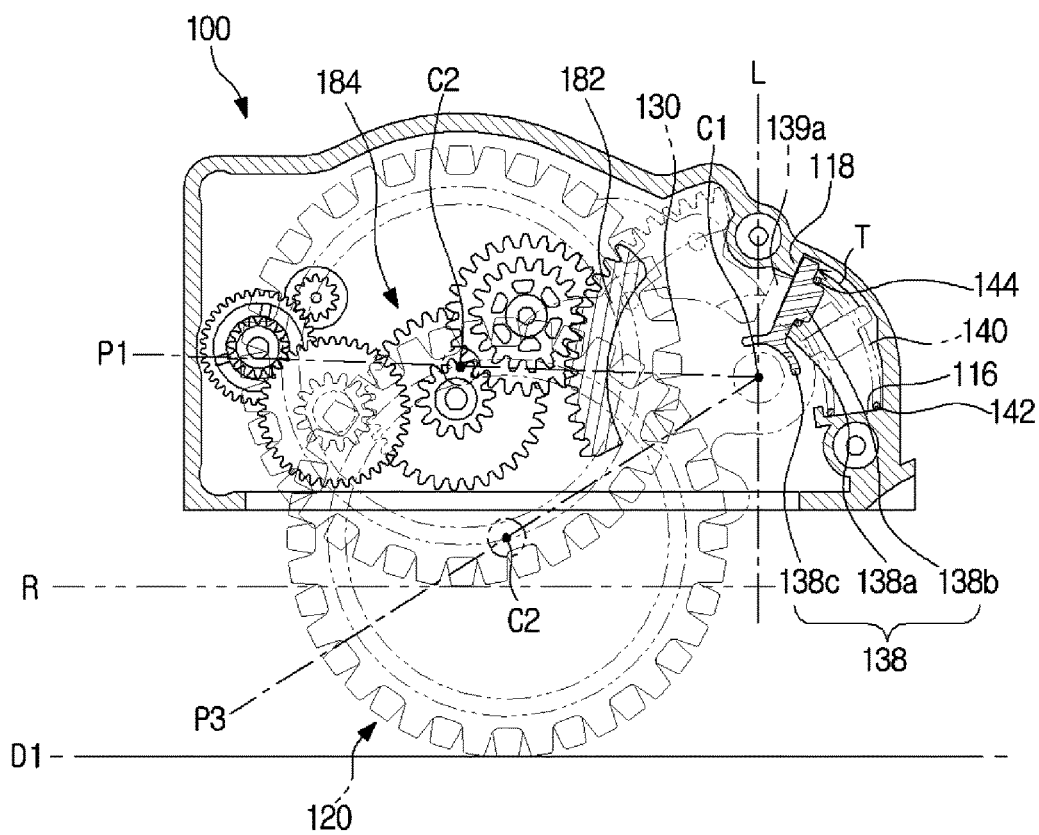
FIG. 7A is a view showing movement ranges of a driving wheel and a wheel frame while a robot cleaner travels normally according to an embodiment of the present disclosure.
Figure 7B:
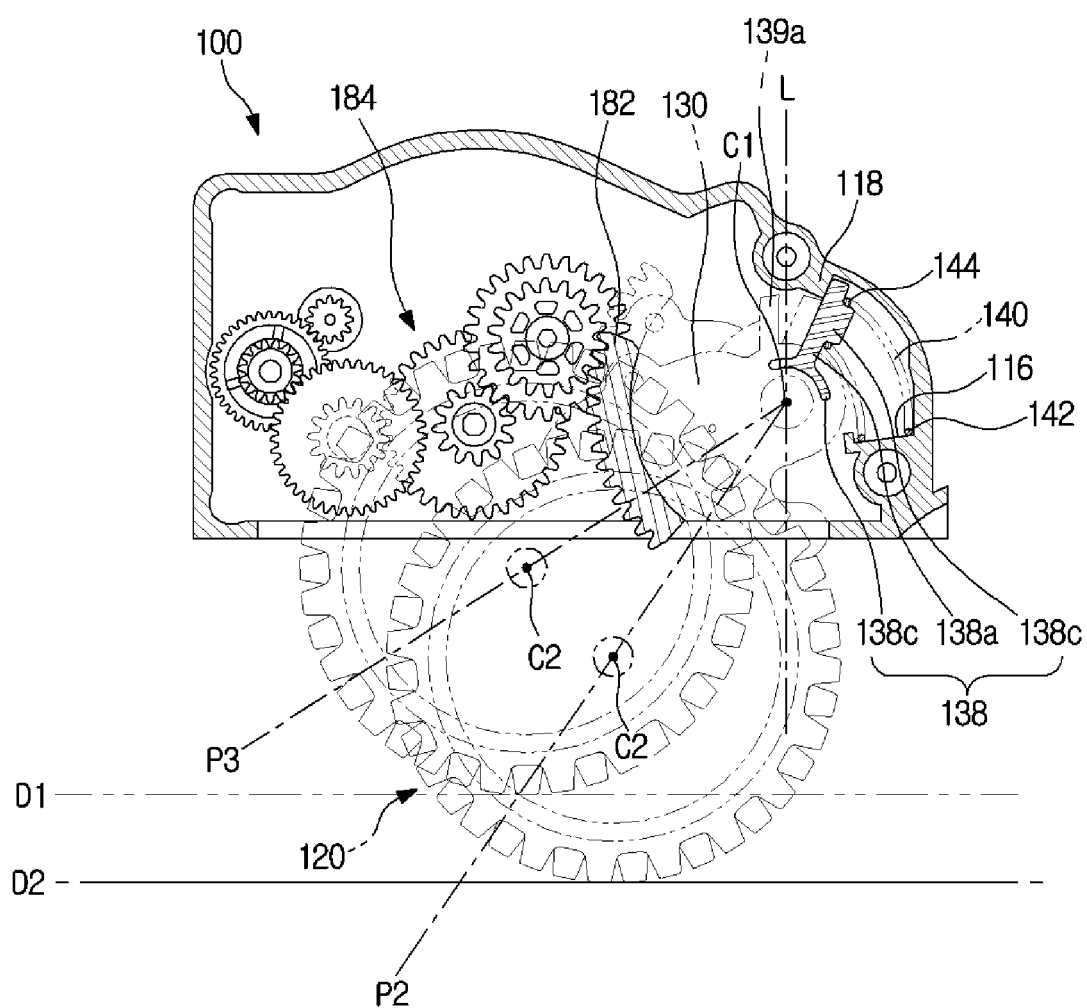
FIG. 7B is a view showing movement ranges of a driving wheel and a wheel frame while a robot cleaner is stuck according to an embodiment of the present disclosure.

The elastic member 140 is disposed opposite to the driving wheel 120 with respect to a number line L that passes through a rotation center C1 of the wheel frame 130 and is disposed closer to the rotation center C1 of the wheel frame 130 than to the driving wheel 120 (see FIGS. 7A and 7B).

The elastic member 140 is disposed while compressed from its original length and configured to press the holder 138 in a tangential direction of a trace T formed by one end of the supporter 138b. A pressing force applied to the holder 138 by the elastic member 140 is transferred to the driving wheel 120 that is in contact with the floor through the second support rib 139a and the wheel frame 130.

The first driving motor 150 includes the motor housing 151 fixedly accommodated inside the housing 110 and the support shaft 151a protruding from the motor housing 151. The support shaft 151a is accommodated by the second rotating shaft 132b.

The motor shaft 152 of the first driving motor 150 is accommodated by the gear accommodation part 131 through the second through-hole 135 formed in the second frame 130b. The motor shaft gear 136a engages with the motor shaft 152. The driving force of the first driving motor 150 is transferred to the driving shaft 124 through the motor shaft 152, the motor shaft gear 136a, the plurality of connection gears 136c, and the driving shaft gear 136b to rotate the wheel 122.

The second driving motor 160 includes a motor housing 161 fixedly accommodated inside the housing 110 and a motor shaft 162. The motor shaft 162 of the second driving motor 160 is disposed in parallel with the motor shaft 152 of the first driving motor 150.

A motor shaft gear 184a engages with the motor shaft 162. The driving force of the second driving motor 160 is transferred to the driving gear 182 through the motor shaft 162, the motor shaft gear 184a, a plurality of connection gears 184c, and a tilt gear 184b to rotate the wheel frame 130.

Referring to FIG. 5, a wheel driver 170 is composed of the first driving motor 150 and the first driving force transfer gears 136. The driving force of the first driving motor 150 drives the driving wheel 120 through the first driving force transfer gears 136.

Referring to FIG. 6, a wheel frame driver 180 is composed of the second driving motor 160, the driving gear 182, and the second driving force transfer gears 184 disposed between the second driving motor 160 and the driving gear 182. The second driving force transfer gears 184 include the motor shaft gear 184a fixed to the motor shaft 162 of the second driving motor 160, the tilt gear 184b engaged with the driving gear 182, and the plurality of connection gears 136c configured to connect the motor shaft gear 184a and the tilt gear 184b. The second driving force transfer gears 184 are rotatably supported by a support frame 188 fixed to the housing body 111. A rotational speed of the motor shaft 162 decreases after the second driving force transfer gears 184.

An example in which a driving force is transferred between the first driving motor 150 and the driving wheel 120 and between the second driving motor 160 and the wheel frame 130 by the first driving force transfer gears 136 and the second driving force transfer gears 184 has been described above. However, the driving force may be transferred using a driving force transfer belt.

FIG. 7A is a view showing movement ranges of a driving wheel and a wheel frame while a robot cleaner travels normally according to an embodiment of the present disclosure, and FIG. 7B is a view showing movement ranges of a driving wheel and a wheel frame while the robot cleaner is stuck according to an embodiment of the present disclosure.

Referring to FIG. 7A, while the robot cleaner 1 is in a normal travel state, the wheel frame 130 rotates between a first position P1 and a third position P3, and the driving wheel 120 moves between a reference position R and a first drop position D1. A maximum rotation position of the wheel frame 130 caused by a tensile force of the elastic member 140 is the third position P3. At this time, a maximum drop position of the driving wheel 120 is the first drop position D1.

Referring to FIG. 7B, when the robot cleaner 1 is stuck, the wheel frame 130 rotates between the third position P3 and a second position P2, and the driving wheel 120 moves between the first drop position D1 and a second drop position D2. The maximum rotation position of the wheel frame 130 caused by a driving force of the second driving motor 160 is the second position P2. At this time, the maximum drop position of the driving wheel 120 is the second drop position D2.

FIG. 8 is a control block diagram showing a robot cleaner that determines that the robot cleaner is stuck and escapes from being stuck according to an embodiment of the present disclosure.

Referring to FIG. 8, a robot cleaner 1 according to an embodiment of the present disclosure includes an input unit 200 configured to receive a motion command from a user, a sensing unit 210 configured to detect various kinds of information about a cleaning region in which the robot cleaner 1 travels, and a controller 220 configured to determine a travel state of the robot cleaner 1 (i.e., whether it is stuck) according to sensor information of the sensing unit 210 and control a first driving motor 150 and a second driving motor 160.

The input unit 200 includes a plurality of buttons on a top of a main body 10 or on a remote controller (not shown) to receive a motion command or a cleaning command of the robot cleaner 1 and transfer the received information to the controller 220.

The sensing unit 210 includes an encoder 211 configured to measure a movement amount of the first driving motor 150 that rotates according to the motion command of the user, a position sensor 212 configured to measure an actual movement distance of the robot cleaner 1, a tilt sensor 213 configured to measure an actual movement angle (direction) of the robot cleaner 1, and a current sensor 214 configured to measure an electric current flowing in the second driving motor 160.

The encoder 211 is attached to the first driving motor 150 and used to measure a movement amount generated by the motion command of the robot cleaner 1. The encoder 211 may be replaced when a movement amount calculated back from the motion command of the robot cleaner 1 is used.

Furthermore, the encoder 211 is used to generate a positional variation due to movement intended by the robot cleaner 1, and thus the encoder 211 calculates the movement intended by the robot cleaner 1. In this case, a distance variation and an angle variation of the robot cleaner 1 caused by the motion command of the robot cleaner 1 are applied to a low-pass filter (hereinafter referred to as an "LPF") in order to compensate for a system delay. The distance variation and the angle variation obtained from the encoder 211 are applied to the LPF in order to remove noise therefrom. The distance variation and the angle variation of the robot cleaner 1 obtained in this way are applied preferentially to those obtained from the information of the encoder 211. When the distance variation and the angle variation of the robot cleaner 1 obtained from the motion command are significantly different from those obtained from the encoder 211, the distance variation and the angle variation of the robot cleaner 1 to be generated from an upper motion command of the robot cleaner 1 are generated in a method of using the distance variation and the angle variation of the robot cleaner 1 obtained from the motion command.

This is why a movement variation intended by the upper motion command of the robot cleaner 1 is trusted as what is obtained from the information of the encoder 211 in order to obtain accurate information that is expressed as actual movement, but the distance variation and the angle variation of the robot cleaner 1 calculated from the motion command is used to compensate for a value obtained by an intended movement even when movement is limited because of a caught wheel.

The position sensor 212 is used to measure the actual movement amount of the robot cleaner 1. An optical flow sensor may be used when there is no light or even when there are hardly any feature points on a ceiling. The position variation read by the optical flow sensor at a position where the sensor is installed is converted into a position variation at the center coordinates of the robot cleaner 1 and then used. When a localization technique or a simultaneous localization and mapping (SLAM) technique that can find an absolute position is used, a position estimated from the absolute position may be used. This is for using an actual position calculation value of the robot cleaner 1 estimated from a technique for measuring an actual position of the robot cleaner 1. The value obtained in this way is also applied to the LPF to remove noise therefrom.

Furthermore, the position sensor 212 may be installed at any position where the actual movement amount of the robot cleaner 1 may be measured, and also one or more such position sensors 212 may be installed.

The tilt sensor 213 denotes a sensor module for measuring a tilt of the robot cleaner 1. The tilt sensor 213 includes a gyro sensor that directly measures the tilt of the robot cleaner 1 using a gravity direction and also a 3-axis acceleration sensor and a 3-axis angular velocity that are used to obtain the tilt of the robot cleaner 1 through sensor fusion.

Furthermore, the tilt sensor 213 may also use a 2-axis tilt sensor that may measure a roll/pitch value to detect a stuck possibility and generate a stuck condition by measuring the tilt of the robot cleaner 1 and a variation of the tilt.

The current sensor 214 is installed in a power source circuit and configured to measure electric currents flowing through the first driving motor 150 and the second driving motor 160 and transfer the measured electric current to the controller 220.

Because of the weight of the main body 10 of the robot cleaner 1, a constant electric current flows through the first driving motor 150 and the second driving motor 160.

However, when the bottom of the robot cleaner 1 is stuck on a door sill or an obstacle, the main body 10 of the robot cleaner 1 is lifted to separate the driving wheel 120 from the floor. Thus, the weight of the main body 10 applied to the second driving motor 160 decreases, and thus the electric current flowing through the second driving motor 160 decreases.

Accordingly, the controller 220 may detect whether the robot cleaner 1 is stuck, that is, whether the bottom of the robot cleaner 1 is lifted, according to the electric current value measured by the current sensor 214.

The controller 220 lowers the driving wheel 120 to the floor in order to escape from being stuck when the bottom of the robot cleaner 1 is lifted. When the driving wheel 120 is lowered, the controller 220 controls an electric current flowing through the second driving motor 160 by increasing an output of the second driving motor 160 until a traction force between the driving wheel 120 and the floor, that is, a frictional force between the driving wheel 120 and the floor, is secured.

In addition, the controller 220 controls overall operations of the robot cleaner 1. For example, the controller 220 controls the first driving motor 150 so that the robot cleaner 1 may travel according to a motion command of the input unit 200.

Furthermore, the controller 220 determines whether the robot cleaner 1 is immobile (i.e., stuck) according to the motion command of the input unit 200 and sensor information of the sensing unit 210 and then controls the second driving motor 160 so that the robot cleaner 1 may escape from being stuck.

To this end, the controller 220 includes a first distance calculator 221 configured to estimate a variation H1 of an expected movement distance of the robot cleaner 1 according to a motion command of the input unit 200, a second distance calculator 222 configured to calculate a variation H2 of a movement distance of the robot cleaner 1 according to a measured value of the encoder 211, a third distance calculator 223 configured to calculate a variation H3 of a movement distance of the robot cleaner 1 according to sensor information of the position sensor 212, a first angle calculator 224 configured to calculate a variation G1 of a movement angle of the robot cleaner 1 according to the measured value of the encoder 211, a second angle calculator 225 configured to calculate a variation G2 of an angle of the robot cleaner 1 according to the sensor information of the tilt sensor 213, a first stuck candidate detector 226 configured to detect whether the robot cleaner 1 is immobile according to the distance variations H1, H2, and H3 calculated by the first, second, and third distance calculators 221, 222, and 223, a second stuck candidate detector 227 configured to detect whether the robot cleaner 1 is immobile according to the angle variations G1 and G2 calculated by the first and second angle calculators 224 and 225, a stuck determiner 228 configured to determine whether the robot cleaner 1 is stuck using a stuck candidate detected by the first and second stuck candidate detectors 226 and 227, and a current controller 229 configured to control an electric current supplied to the second driving motor 160 using an electronic current measured by the current sensor 214 in order for the robot cleaner 1 to escape from being stuck.

After determining whether the robot cleaner 1 is stuck, the stuck determiner 228 measures the electric current flowing through the second driving motor 160 for driving the wheel frame 130 through the current sensor 214 and detects whether the driving wheel 120 is restricted.

A cleaning unit 230 drives a main brush and a side brush to perform a cleaning work by sucking up foreign substances such as dust from a floor of a cleaning region in which the robot cleaner 1 travels according to a driving command of the controller 220.

A storage unit 240 stores a predetermined travel pattern and travel path, and sensor information detected while the robot cleaner 1 travels according to a cleaning command of the robot cleaner 1.

In addition, the storage unit 240 may also store map information of the cleaning region.

Figure 9:
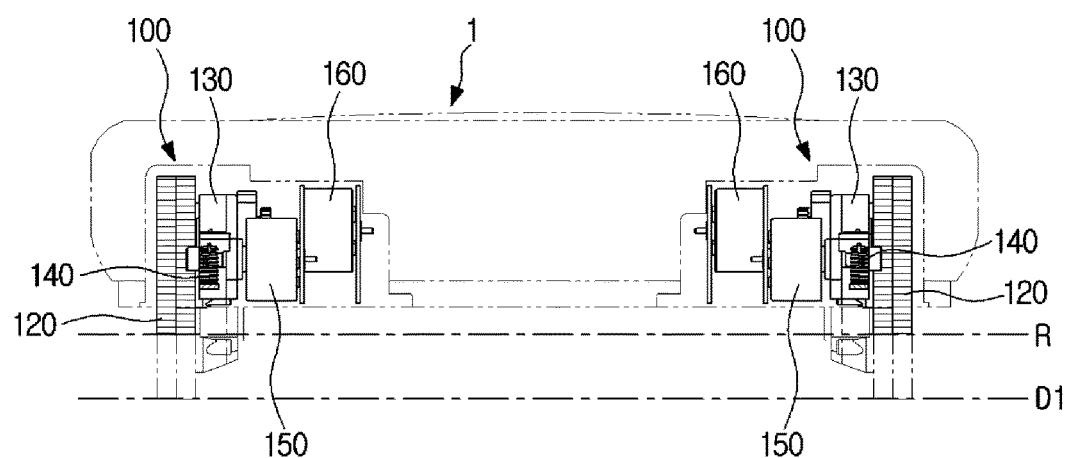
FIG. 9 is a view showing a state in which a robot cleaner travels normally according to an embodiment of the present disclosure.
Figure 10:
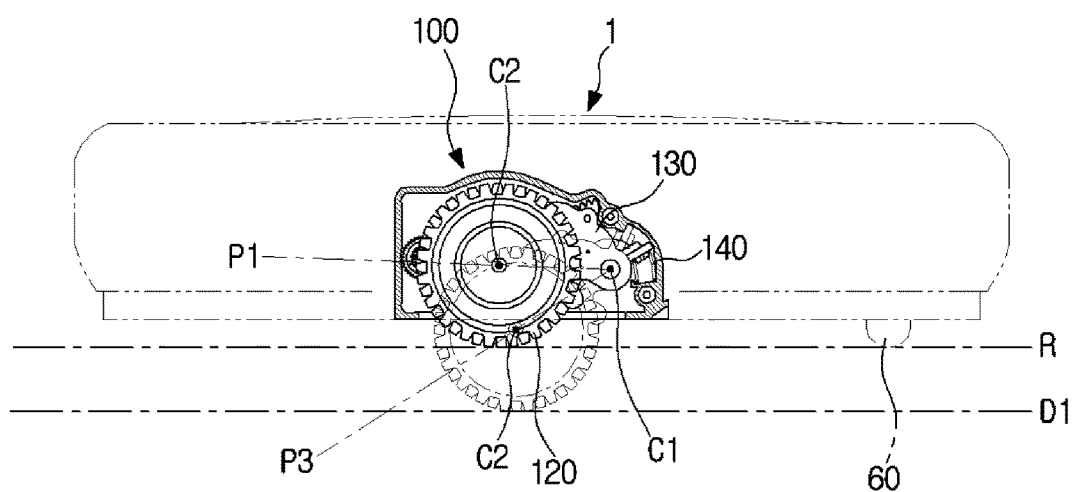
FIG. 10 is a side view of FIG. 9.

FIG. 9 is a view showing a state in which a robot cleaner travels normally according to an embodiment of the present disclosure, and FIG. 10 is a side view of FIG. 9.

Referring to FIGS. 9 and 10, while a robot cleaner 1 travels normally, a wheel frame 130 rotates between a first position P1 and a third position P3 while pressing or being pressed by an elastic member 140, and a driving wheel 120 moves between a reference position R and a first drop position D1 according to the rotation of the wheel frame 130.

A controller 220 does not operate a second driving motor 160 because a traction force between the driving wheel 120 and a floor that is needed for the robot cleaner 1 to travel normally is secured by the rotation of the wheel frame 130 caused by a pressing force of the elastic member 140.

Figure 11A:
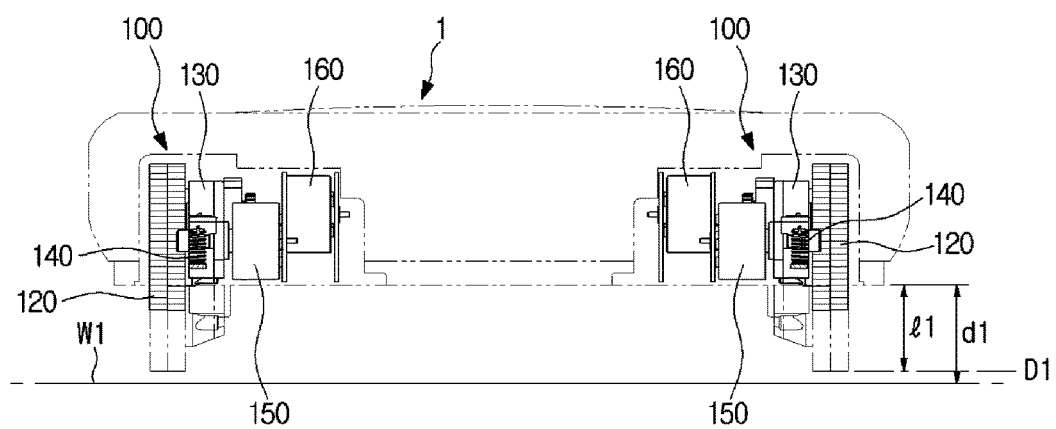
FIGS. 11A to 11C are views showing a process in which a robot cleaner escapes from being lifted and thus stuck (i.e., the robot cleaner is immobile because both driving wheels are lifted) according to an embodiment of the present disclosure.
Figure 11B:
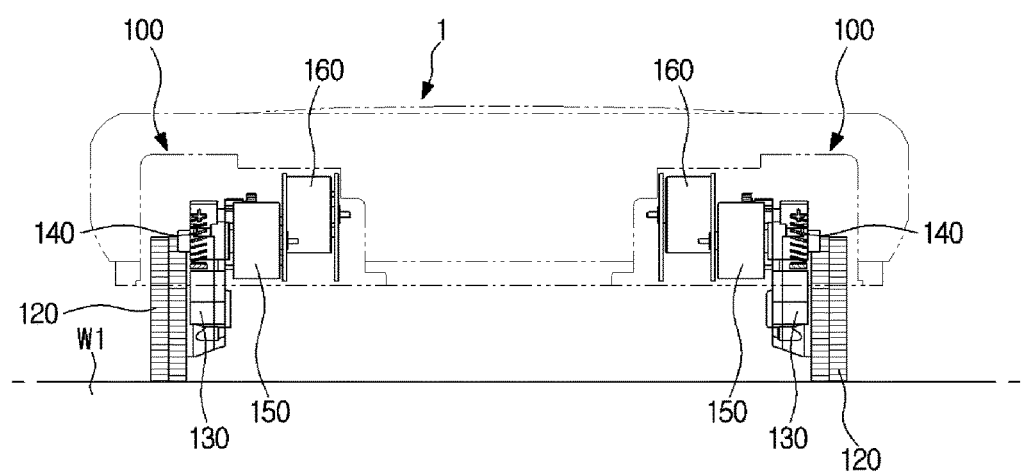
Figure 11C:
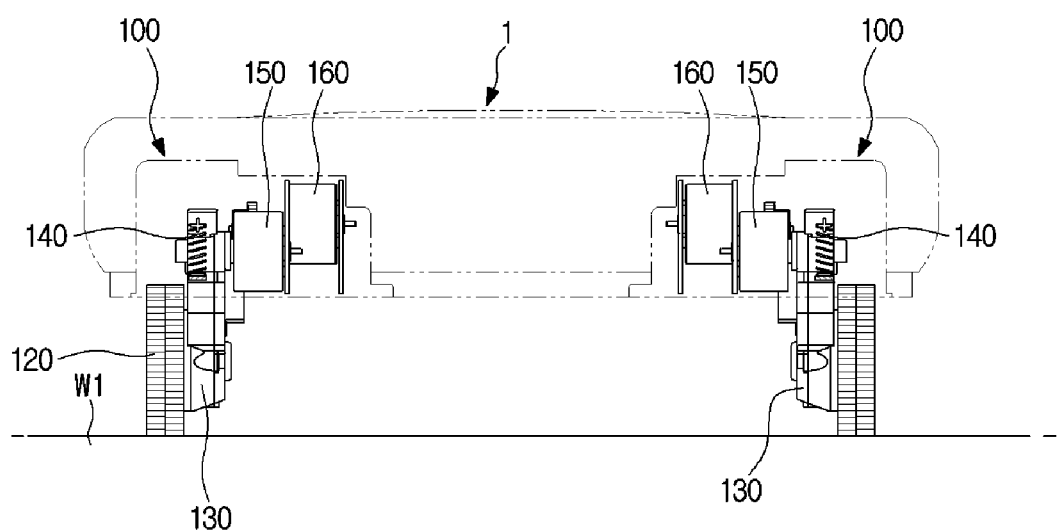
Figure 12A:
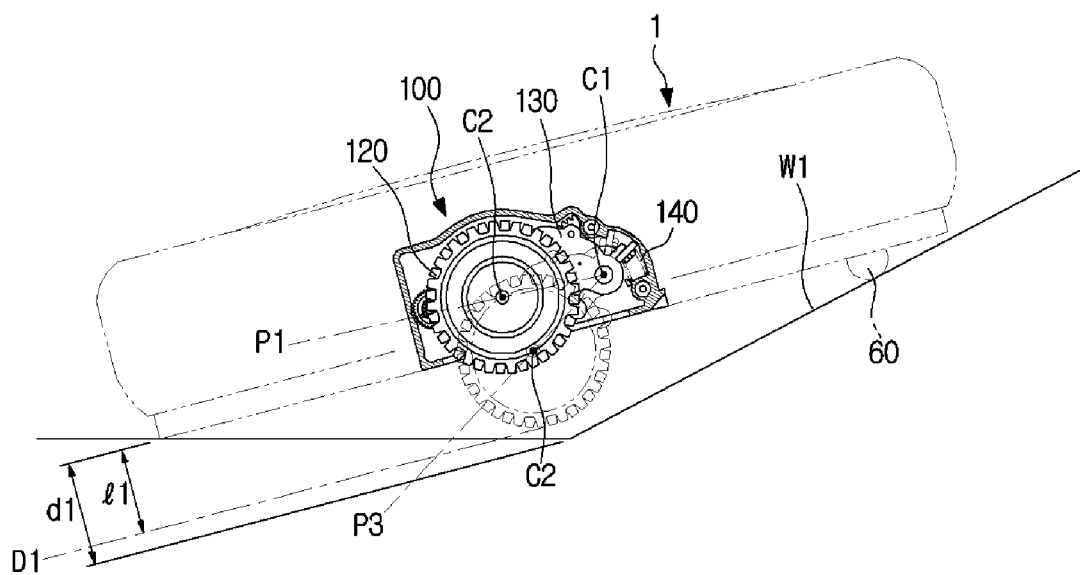
FIGS. 12A to 12C are side views of FIGS. 11A to 11O, respectively.
Figure 12B:
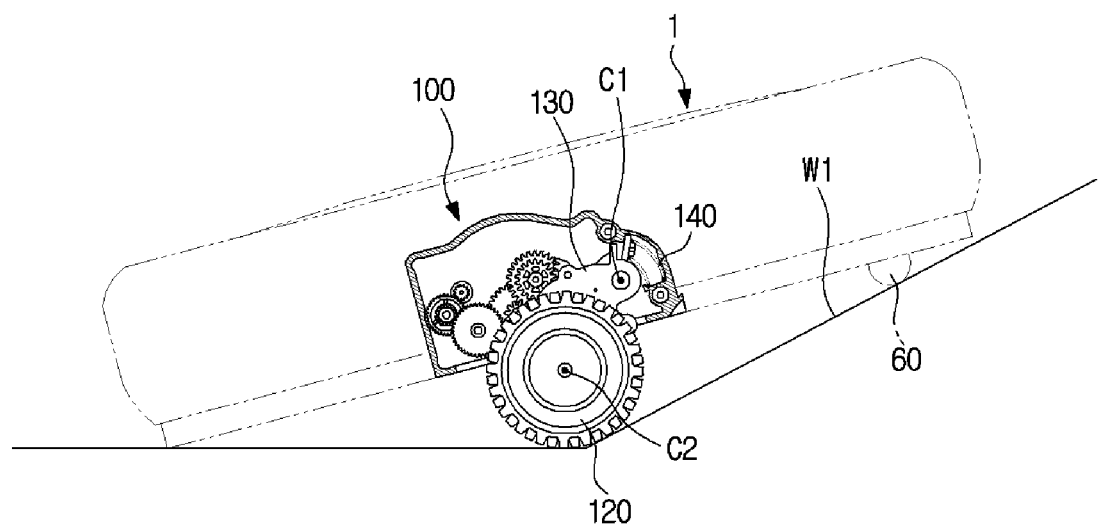
Figure 12C:
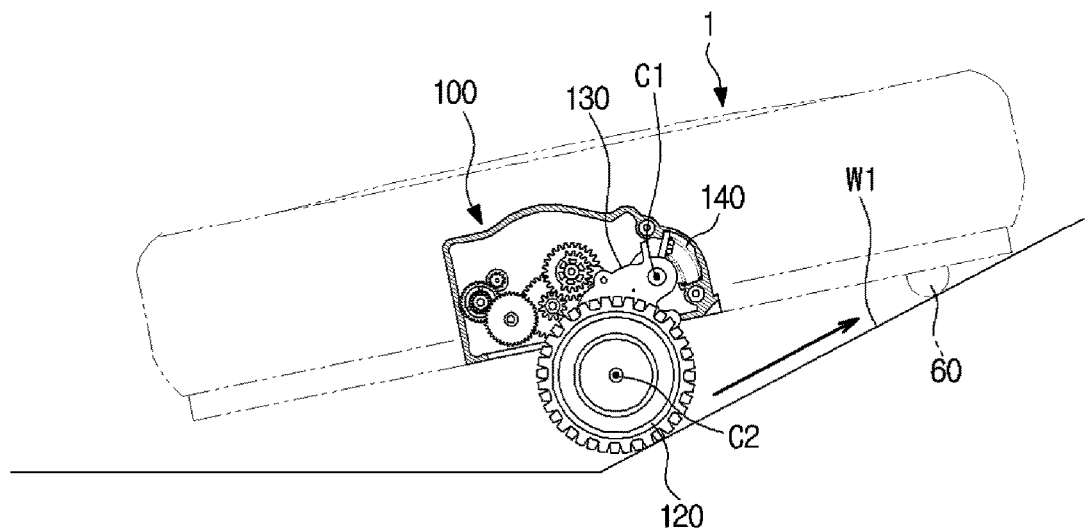

FIGS. 11A to 11C are views showing a process in which a robot cleaner escapes from being lifted and thus stuck (i.e., the robot cleaner is immobile because both driving wheels are lifted) according to an embodiment of the present disclosure, and FIGS. 12A to 12C are side views of FIGS. 11A to 11C, respectively.

Referring to FIGS. 11A to 11C and FIGS. 12A to 12C, when a distance d1 between the bottom of a robot cleaner 1 and an obstacle W1 is greater than a maximum drop distance l1 by which driving wheels 120 can be lowered by a pressing force of an elastic member 140 (i.e., a distance between the bottom of the robot cleaner 1 and a first drop position D1) while the robot cleaner 1 crosses over the obstacle W1, the robot cleaner 1 gets stuck and does not move because both of the driving wheels 120 are lifted. In this case, a holder 138 of each of the driving wheels 120 is in contact with a stopper 118 and limits the rotation of the driving wheels 120, and the elastic member 140 can no longer press a wheel frame 130.

When the robot cleaner 1 is stuck, a controller 220 increases an output of a second driving motor 160 of each of the driving units 100. A driving force of the second driving motor 160 having the increased output is transferred to the wheel frame 130 through second driving force transfer gears 184 and a driving gear 182 to rotate the wheel frame 130. The driving wheel 120 is lowered to a surface of the obstacle W1 according to the rotation of the wheel frame 130. In this case, the wheel frame 130 may rotate from a third position P3 to a second position P2, and the driving wheel 120 may be lifted from the first drop position D1 to a second drop position D2.

When the driving wheel 120 is in contact with a floor of the obstacle W1 to increase an electric current flowing through the second driving motor 160 to the degree that the robot cleaner 1 can escape from being stuck, the controller 220 stops the second driving motor 160.

Subsequently, the robot cleaner 1 escapes from being stuck and is freed from the obstacle W1. Next, the robot cleaner 1 is controlled to return to a normal travel state and recover cleaning performance.

The second driving motor 160 may also operate independently of the elastic member 140 even when a pressing force of the elastic member 140 is applied to the wheel frame 130. For example, a traction force between the driving wheel 120 and the floor may not be sufficiently obtained by only the pressing force of the elastic member 140 according to material of the floor. In this case, the controller 220 performs control to recover the travel performance of the robot cleaner 1 by increasing an output of the second driving motor 160 to increase the traction force between the driving wheel 120 and the floor.

Figure 13A:
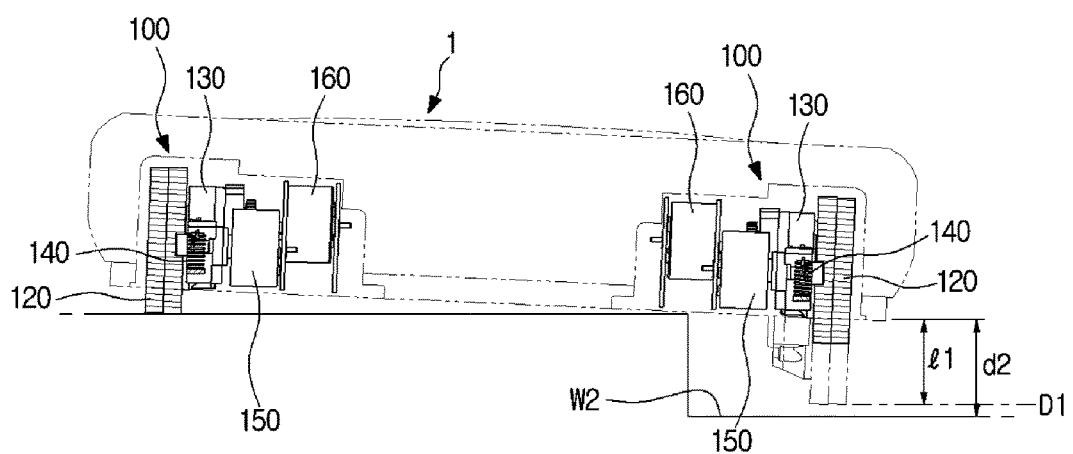
FIGS. 13A to 13C are views showing a process in which a robot cleaner escapes from being lifted and thus stuck (i.e., the robot cleaner is immobile because one driving wheel is lifted) according to an embodiment of the present disclosure.
Figure 13B:
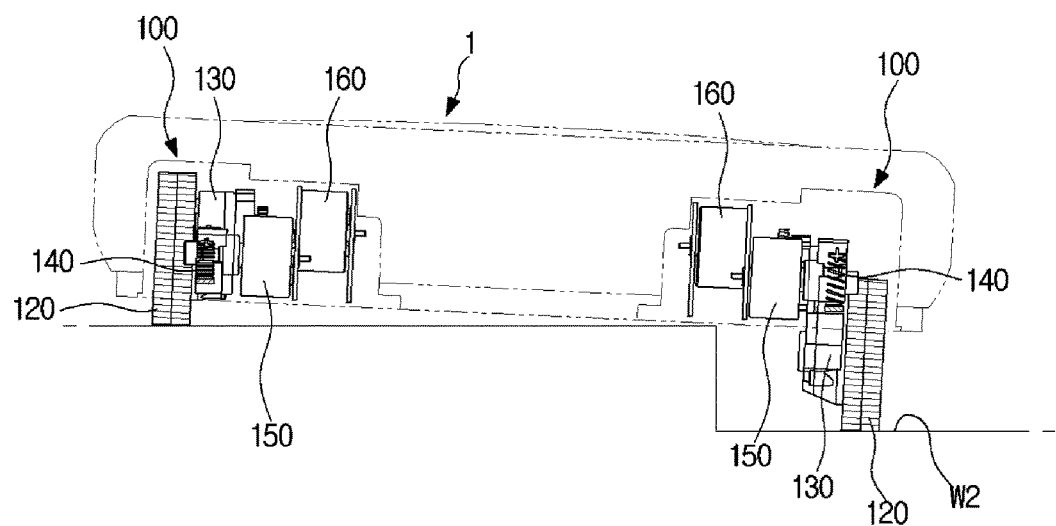
Figure 13C:
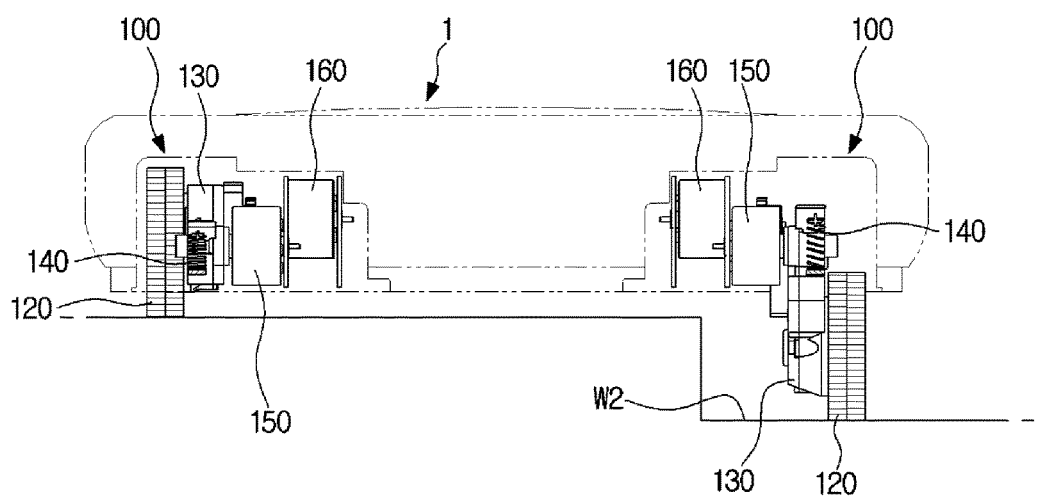
Figure 14A:
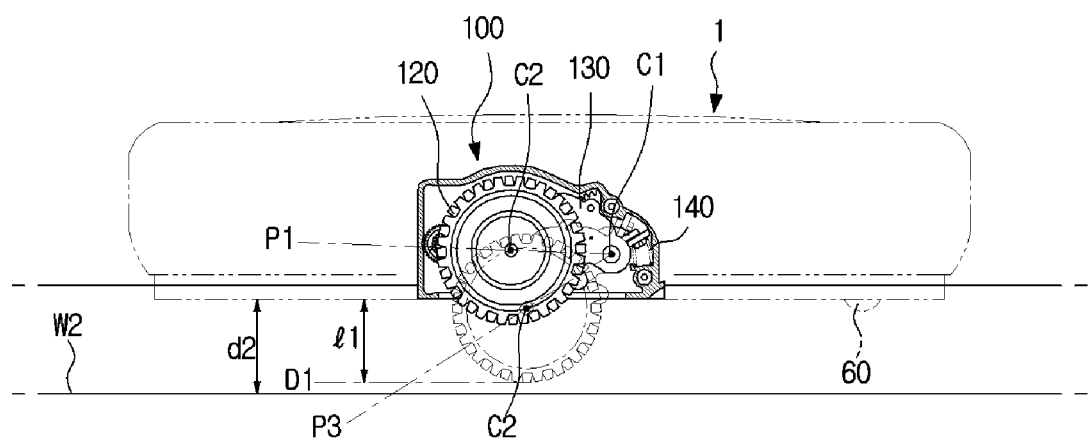
FIGS. 14A to 14C are side views of FIGS. 13A to 13C, respectively.
Figure 14B:
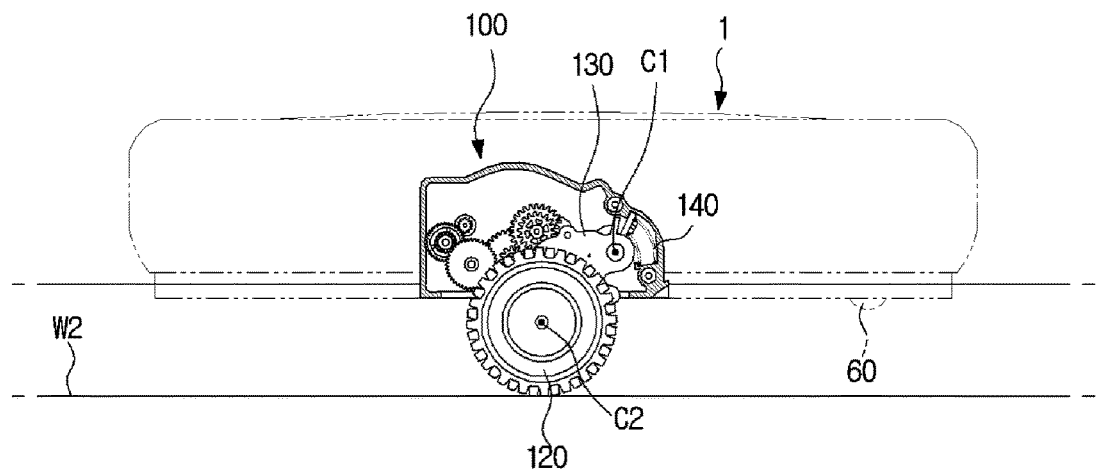
Figure 14C:
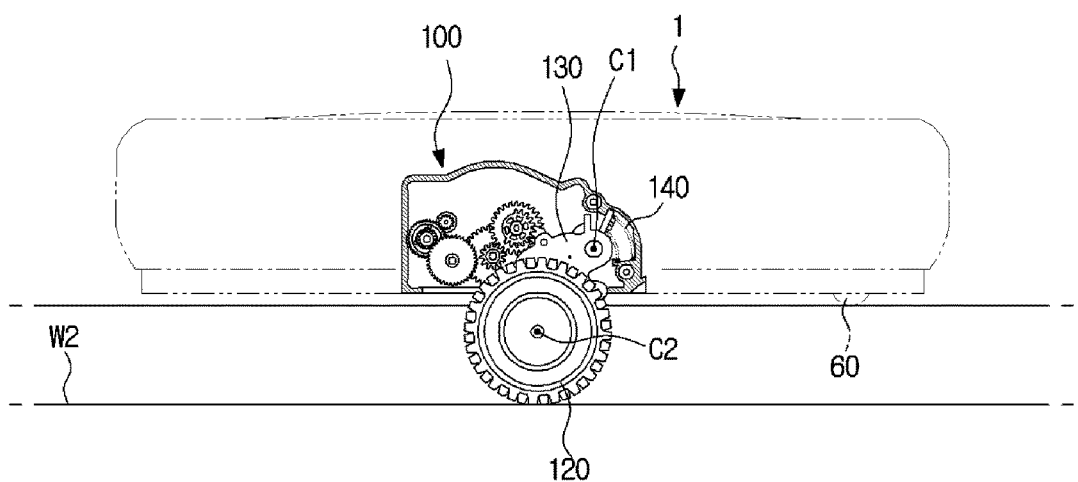

FIGS. 13A to 13C are views showing a process in which a robot cleaner escapes from being lifted and thus stuck (i.e., the robot cleaner is immobile because one driving wheel is lifted) according to an embodiment of the present disclosure, and FIGS. 14A to 14C are side views of FIGS. 13A to 13C, respectively.

Referring to FIGS. 13A to 13C and FIGS. 14A to 14C, when a distance d2 between the bottom of a robot cleaner 1 and a floor W2 is greater than a maximum drop distance l1 by which a driving wheel 120 may be lowered by a pressing force of an elastic member 140 (i.e., a distance between the bottom of the robot cleaner 1 and a first drop position D1) while the robot cleaner 1 travels on a floor having a large curve, the robot cleaner 1 is stuck and immobile because one driving wheel 120 is lifted. In this case, a holder 138 of the driving wheel 120 is in contact with a stopper 118, and thus rotation is limited. The elastic member 140 can no longer press a wheel frame 130.

When it is determined that the robot cleaner 1 is stuck, a controller 220 increases an output of a second driving motor 160 of a driving unit 100 of the lifted driving wheel 120. A driving force of the second driving motor 160 having the increased output is transferred to the wheel frame 130 through second driving force transfer gears 184 and a driving gear 182 to rotate the wheel frame 130. The driving wheel 120 is lowered to a floor W2 according to the rotation of the wheel frame 130. In this case, the wheel frame 130 may rotate from a third position P3 to a second position P2, and the driving wheel 120 may be lifted from the first drop position D1 to a second drop position D2.

When the driving wheel 120 is in contact with the floor W2 and thus an electric current flowing through the second driving motor 160 increases to the degree that the robot cleaner 1 can escape from being stuck, the controller 220 stops the second driving motor 160.

Subsequently, the robot cleaner 1 escapes from being stuck and is freed from the floor W2. Next, the robot cleaner 1 is controlled to return to a normal travel state and recover cleaning performance.

Figure 15A:
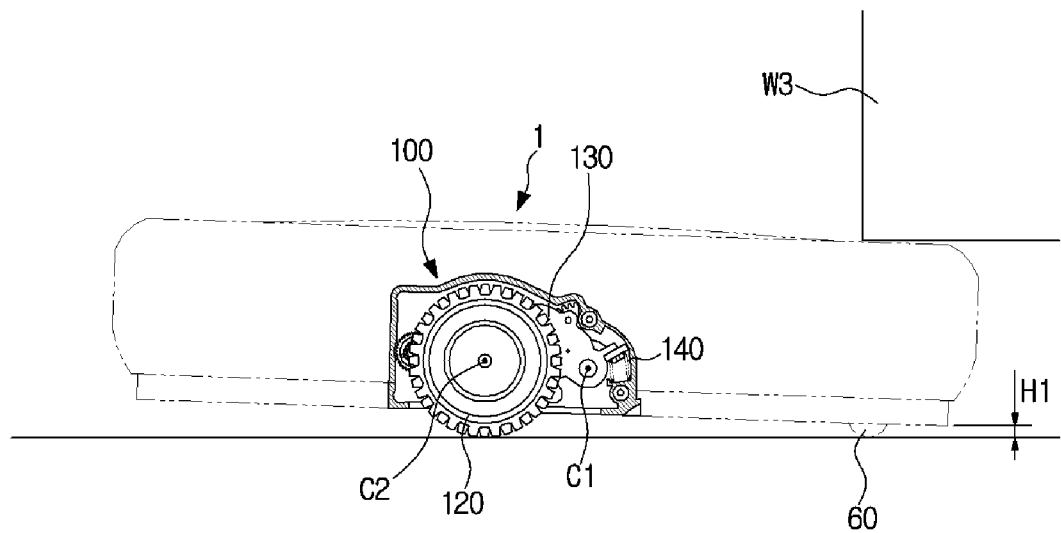
FIGS. 15A to 15C are views showing a process in which a robot cleaner escapes from being caught and thus stuck (i.e., the robot cleaner is caught at the front and thus is immobile) according to an embodiment of the present disclosure.
Figure 15B:
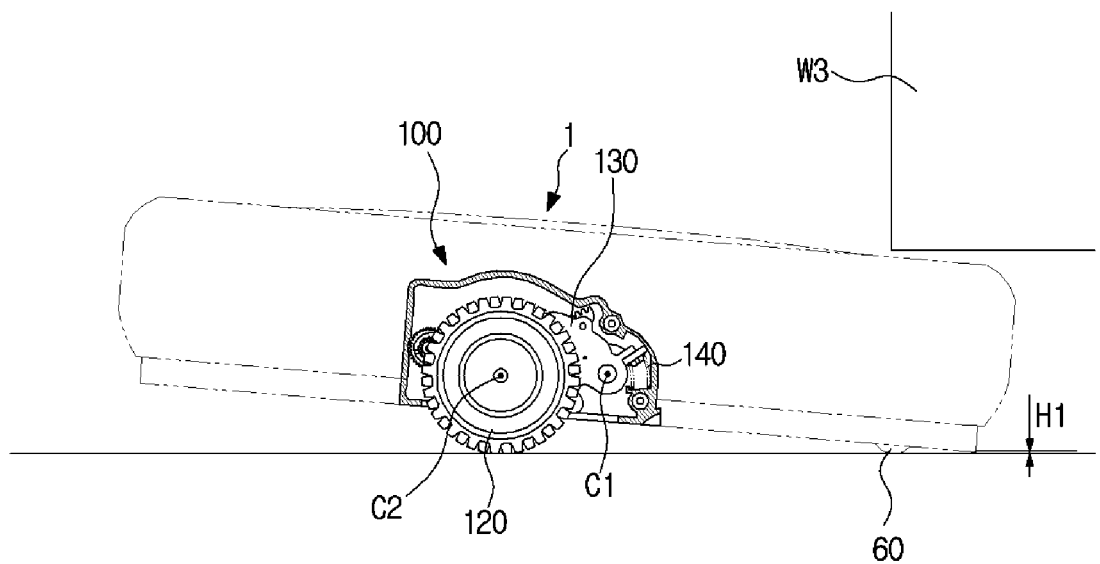
Figure 15C:
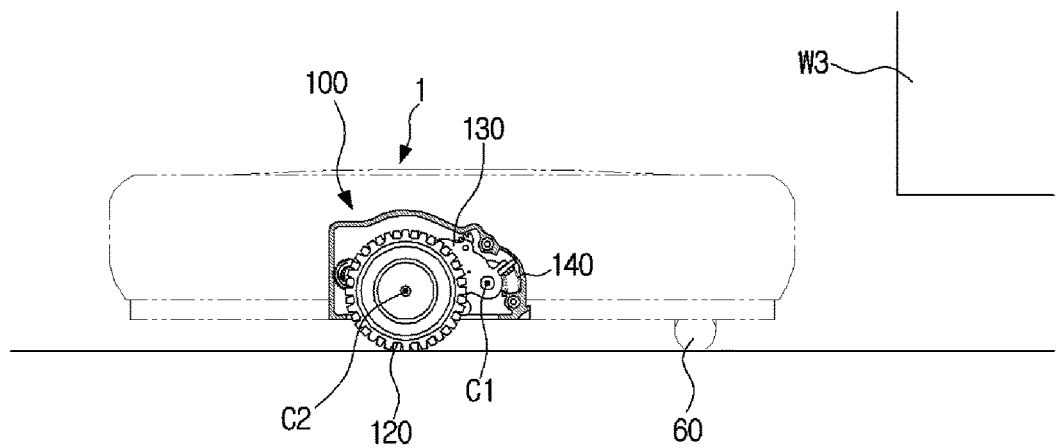

FIGS. 15A to 15C are views showing a process in which a robot cleaner escapes from being caught and thus stuck (i.e., the robot cleaner is caught at the front and thus is immobile) according to an embodiment of the present disclosure.

Referring to FIGS. 15A to 15C, when a robot cleaner 1 enters a narrow gap of an obstacle W3, the robot cleaner 1 is caught at an upper front ("caught at the top") and thus is stuck and immobile. Both driving wheels 120 and first driving motors 150 are restricted when the robot cleaner 1 is "caught at the top" and thus stuck. That is, the phrase "caught at the top" denotes a state in which neither of the driving wheels 120 of the driving units 100 can recover a driving force by only an elastic force of an elastic member 140.

Since neither of the driving wheels 120 of the driving units 100 is rotated, an overcurrent flows through first driving motors 150 of both driving units 100. A controller 220 senses the overcurrent by a current sensor 214 and determines whether the robot cleaner 1 is "caught at the top" and thus stuck.

When the robot cleaner 1 is "caught at the top" and thus stuck, the controller 220 drives a second driving motor 160 of both of the driving units 100. A driving force of the second driving motor 160 is transferred to a wheel frame 130 through second driving force transfer gears 184 and a driving gear 182 to rotate the wheel frame 130. The driving wheel 120 is lowered according to the rotation of the wheel frame 130, and thus an overall height H1 of the robot cleaner 1 relatively decreases.

When the driving wheel 120 recovers a driving force to the degree that the robot cleaner 1 can escape from being stuck, the controller 220 stops the second driving motor 160.

Subsequently, the robot cleaner 1 travels in a direction opposite to a direction in which the robot cleaner 1 entered the obstacle W3 to escape from being stuck and be freed from the obstacle W3. Next, the robot cleaner 1 is controlled to return to a normal travel state and recover cleaning performance.

Figure 16A:
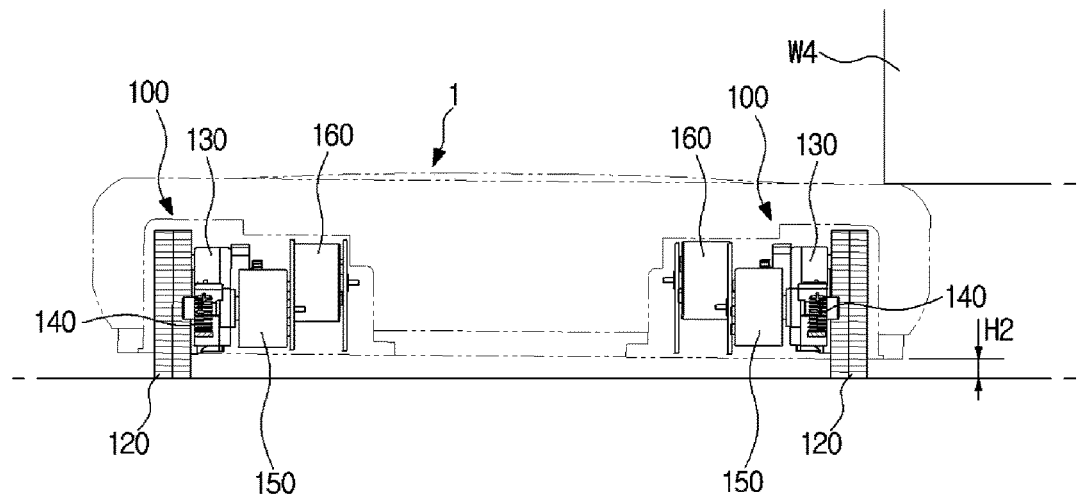
FIGS. 16A and 16B are views showing a process in which a robot cleaner escapes from being caught and thus stuck (i.e., the robot cleaner is caught at a side and thus is immobile) according to an embodiment of the present disclosure.
Figure 16B:
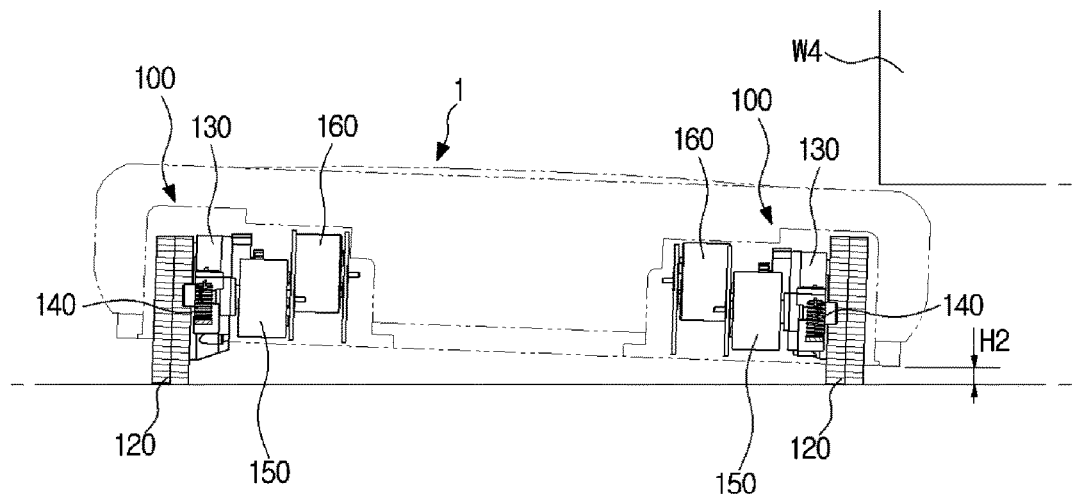

FIGS. 16A and 16B are views showing a process in which a robot cleaner escapes from being caught and thus stuck (i.e., the robot cleaner is caught at a side and thus is immobile) according to an embodiment of the present disclosure.

Referring to FIGS. 16A and 16B, when a robot cleaner 1 enters a narrow gap of an obstacle W4, the robot cleaner 1 is "caught at a side" and thus stuck and immobile. A driving wheel 120 and a first driving motor 150 of a caught driving unit 100 are restricted when the robot cleaner 1 is "caught at a side" and thus stuck. That is, the phrase "caught at a side" denotes a state in which the driving wheel 120 of the caught driving unit 100 cannot recover a driving force by only an elastic force of an elastic member 140.

Since the driving wheel 120 of the caught driving unit 100 cannot rotate, an overcurrent flows through the first driving motor 150 of the caught driving unit 100. At this point, a controller 220 senses the overcurrent by a current sensor 214 and determines whether the robot cleaner 1 is "caught at a side" and thus stuck.

When the robot cleaner 1 is "caught at a side" and thus stuck, the controller 220 operates a second driving motor 160 of an uncaught driving unit 100. A driving force of the second driving motor 160 is transferred to a wheel frame 130 through second driving force transfer gears 184 and a driving gear 182 to rotate the wheel frame 130. The driving wheel 120 is lowered according to the rotation of the wheel frame 130, and thus an overall height H2 of a side of the robot cleaner 1 relatively decreases.

When the driving wheel 120 recovers a driving force to the degree that the robot cleaner 1 can escape from being stuck, the controller 220 stops the second driving motor 160.

Subsequently, the robot cleaner 1 travels in a direction opposite to a direction in which the robot cleaner 1 entered the obstacle W4 to escape from being stuck and be freed from the obstacle W4. Next, the robot cleaner 1 is controlled to return to a normal travel state and recover cleaning performance.

An operation process and an acting effect of the robot cleaner and a control method thereof according to an embodiment will be described below.

Figure 17A:
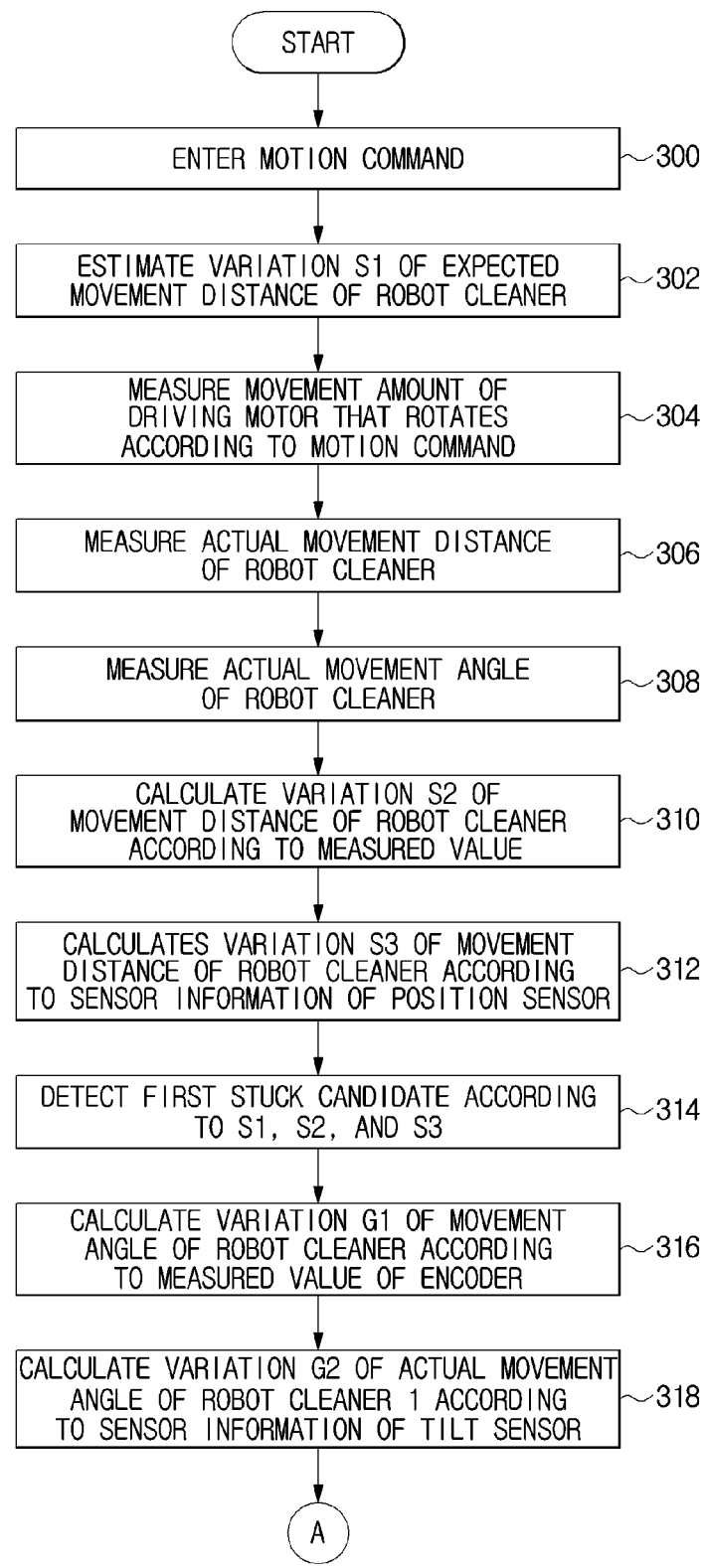
FIGS. 17A and 17B are flowcharts showing a travel control method for a robot cleaner according to an embodiment of the present disclosure.
Figure 17B:
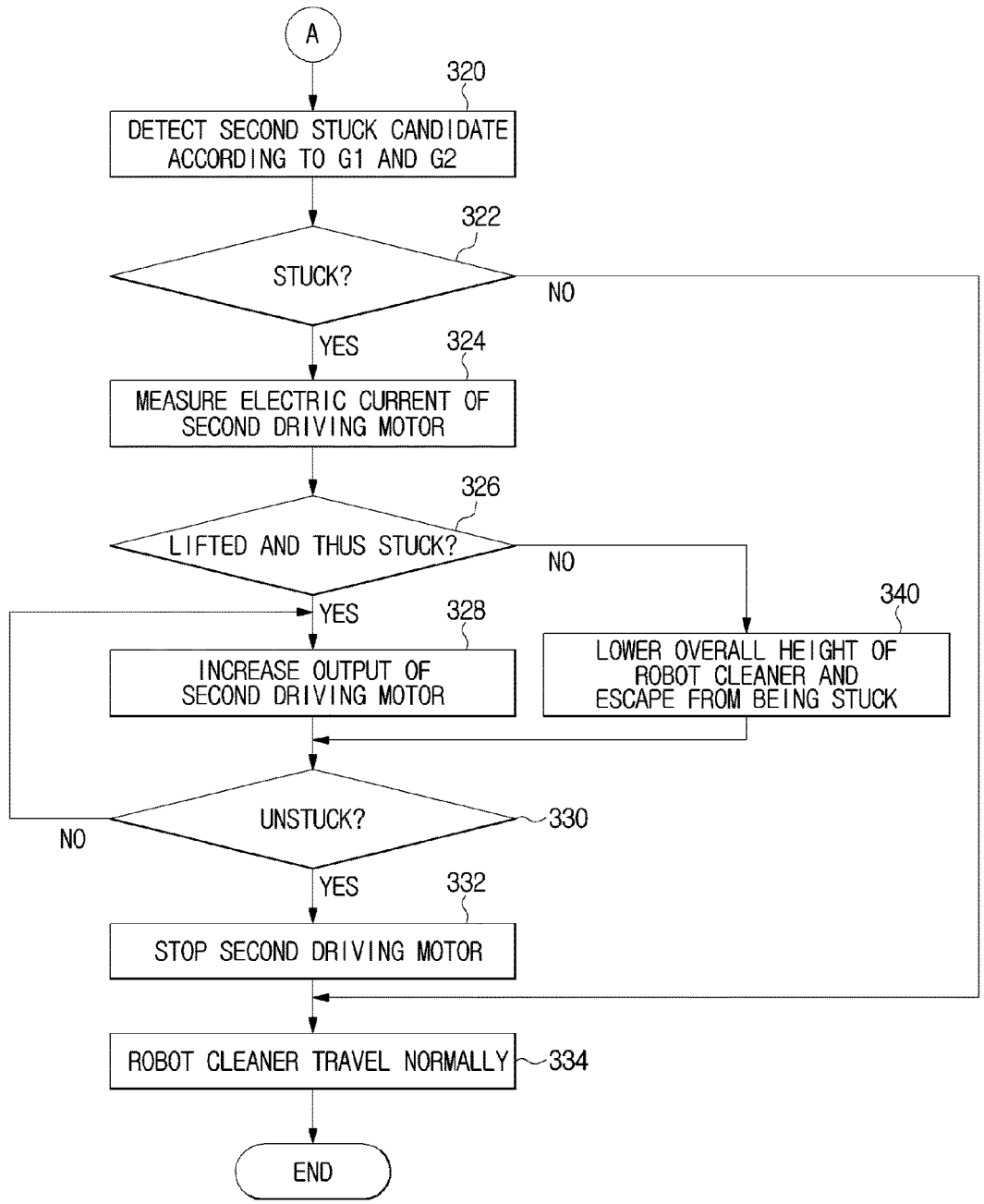

FIGS. 17A and 17B are flowcharts showing a travel control method for a robot cleaner according to an embodiment of the present disclosure.

Referring to FIGS. 17A and 17B, when a user enters a motion command of a robot cleaner 1 through an input unit 200 (S300), a controller 220 receives the motion command entered through the input unit 200 and estimates a variation S1 of an expected movement distance of the robot cleaner 1 (S302).

The controller 220 rotates a driving wheel 120 in a forward direction or a backward (reverse) direction by rotating first driving motors 150 of both driving units 100 of the robot cleaner 1 according to the motion command. Thus, the robot cleaner 1 may move in a predetermined travel pattern (e.g., traveling in right angles or traveling randomly) while traveling a floor.

An encoder 211 measures a movement amount of the first driving motor 150 and transfers the measured movement amount to the controller 220 according to the motion command (S304).

In this case, a position sensor 212 measures an actual movement distance of the robot cleaner 1 and transfers the measured actual movement distance to the controller (S306), and a tilt sensor 213 measures an actual movement angle (direction) of the robot cleaner 1 and transfers the measured actual movement angle (direction) to the controller 220 (S308).

Accordingly, the controller 220 calculates a variation S2 of a movement distance of the robot cleaner 1 through a second distance calculator 222 according to the measured value of the encoder 211 (S310), and calculates a variation S3 of the movement distance of the robot cleaner 1 through a third distance calculator 223 according to the sensor information of the position sensor 212 (S312).

Thus, the controller 220 detects a first stuck candidate that detects whether the robot cleaner 1 is immobile through a first stuck candidate detector 226 according to the distance variations S1, S2, and S3 calculated by first, second, and third distance calculators 221, 222, and 223 (S314).

The first stuck candidate detects a stuck candidate on the basis of an instant movement amount of the robot cleaner 1. The controller 220 detects whether the robot cleaner 1 is immobile by performing comparison and analysis on the distance variation S3 calculated according to the sensor information of the position sensor 212, the distance variation S2 calculated according to the measured value of the encoder 211, and the distance variation S1 estimated according to the motion command.

Next, the controller 220 calculates a variation G1 of a movement angle of the robot cleaner 1 through a first angle calculator 224 according to the measured value of the encoder 211 (S316), and calculates a variation G2 of an actual movement angle of the robot cleaner 1 through a second angle calculator 225 according to the sensor information of the tilt sensor 213 (S318).

Thus, the controller 220 detects a second stuck candidate that detects whether the robot cleaner 1 is immobile through a second stuck candidate detector 227 according to the angle variations G1 and G2 calculated by the first and second angle calculators 224 and 225 (S320).

The second stuck candidate detects a stuck candidate on the basis of an instant angular difference of the robot cleaner 1. The controller 220 detects whether the robot cleaner 1 is immobile by determining whether an angular difference between the angle variation G2 calculated through the sensor information of the tilt sensor 213 and the angle variation G1 calculated according to the measured value of the encoder 211 is larger than a threshold.

When the first stuck candidate and the second stuck candidate are detected, the controller 220 determines whether the robot cleaner 1 is stuck and immobile, using the detected first stuck candidate and second stuck candidate (S322).

When a determination result in S322 is that the robot cleaner 1 is stuck, the controller 220 measures an electric current flowing through the second driving motor 160 through a current sensor 214 (S324) and determines whether the robot cleaner 1 is lifted and thus stuck according to the electric current measured through the current sensor 214 (S326).

Because of the weight of a main body 10 of the robot cleaner 1, a constant electric current flows through the first driving motor 150 configured to generate a driving force for rotating the driving wheel 120 and the second driving motor 160 configured to generate a driving force for rotating a wheel frame 130.

When the robot cleaner 1 normally travels on a flat floor, the driving wheel 120 is not lowered because of the weight of the main body 10 of the robot cleaner 1. In the normal travel, a frictional force F of the flat floor is proportional to an electric current A flowing through the second driving motor 260, as expressed in Equation 1 below:

$$F \propto k*A \qquad \text{[Equation 1]}$$

where F is a force (frictional force) of the driving wheel 120 pressing a floor, K is a constant, and A is an electric current flowing through the second driving motor 160.

However, when the bottom of the robot cleaner 1 is stuck on a door sill or an obstacle, the main body 10 of the robot cleaner 1 is lifted to separate the driving wheel 120 from the floor. Thus, the weight of the main body 10 applied to the second driving motor 160 decreases, and the electric current flowing through the second driving motor 160 decreases.

Accordingly, the controller 220 may detect whether the robot cleaner 1 is stuck, that is, whether the robot cleaner 1 is lifted and thus stuck, using the electric current measured by the current sensor 214.

When a determination result in S326 is that the robot cleaner 1 is lifted and thus stuck, the controller 220 increases an output of the second driving motor 160 in order to maintain an electric current flowing through the second driving motor 160 at a constant level (S328). When the output of the second driving motor 160 is increased, the controller 220 may control an electric current supplied to the second driving motor 160 to lower the driving wheel 120 to the floor.

When the driving wheel 120 is lowered and brought in contact with the floor, the electric current flowing through the second driving motor 160 may increase, thereby securing a traction force between the driving wheel 120 and the floor.

In this way, when the controller 220 lowers the driving wheel 120 while the robot cleaner 1 is lifted at the bottom and thus stuck, the controller 220 controls the electric current flowing through the second driving motor 160 by increasing an output of the second driving motor 160 until a traction force between the driving wheel 120 and the floor, that is, a frictional force of the floor is secured.

When the frictional force of the floor is secured because the driving wheel 120 is in contact with the floor by the increase in the output of the second driving motor 160, the controller 220 determines that a driving force is recovered to the degree that the robot cleaner 1 can escape from being stuck and determines whether the robot cleaner 1 escapes from being stuck (S330).

When a determination result in S330 is that the robot cleaner 1 does not escape from being stuck, the controller 220 returns to S328 and increases an output of the second driving motor 160 until the robot cleaner 1 escapes from being stuck.

When the determination result in S330 is that the robot cleaner 1 escapes from being stuck, the controller 220 stops the second driving motor 160 (S332) and drives the first driving motor 150 to return to the normal travel mode of the robot cleaner 1 in which the driving wheel 120 is rotated (S334).

When a determination result in S326 is that the robot cleaner 1 is not lifted and thus stuck, the controller 220 drives the second driving motor 160 to decrease an overall height of the robot cleaner 1, and the robot cleaner 1 travels in a reverse direction to escape from being stuck (S340). Subsequently, the controller 220 proceeds to S330 and then performs subsequent operations.

When the determination result in S322 is that the robot cleaner 1 is not stuck, the controller 220 proceeds to S334 and then drives the first driving motor 150 so that the robot cleaner 1 may continue travelling normally to rotate the driving wheel 120.

Figure 18:
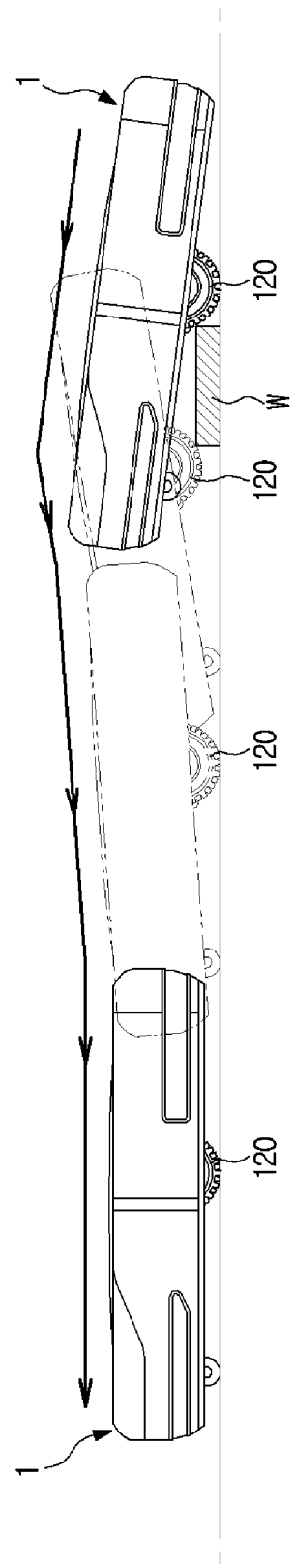
FIG. 18 is a view showing a travel motion in which a robot cleaner escapes from being stuck according to an embodiment of the present disclosure.

FIG. 18 is a view showing a travel motion in which a robot cleaner escapes from being stuck according to an embodiment of the present disclosure.

As shown in FIG. 18, it can be seen that a robot cleaner 1 smoothly escapes from an obstacle W by securing an optimal frictional force between a driving wheel 120 and a floor under the control of an electric current of a second driving motor 160. It can also be seen that the robot cleaner 1 may travel stably without shaking by controlling an electric current flowing through the second driving motor 160 after the robot cleaner 1 escapes from the obstacle W and before the driving wheel 120 returns to a normal mode.

According to the proposed robot cleaner and control method thereof, it is possible to detect that the robot cleaner is stuck, e.g., "caught" or "lifted" using a motion command and sensor information and to quickly escape from being stuck in various travel conditions using a variable wheel structure when it is detected that the robot cleaner is stuck.

The robot cleaner may smoothly escape from a door sill or an obstacle to stably travel irrespective of a state of a floor by providing an optimal frictional force of the floor through the control of an electric current of a motor when the robot cleaner escapes from being stuck.

Also, the robot cleaner may stably travel without shaking by controlling an electric current flowing through the motor after the robot cleaner escapes from being stuck and before the driving wheel returns to a normal mode. Furthermore, it is possible to prevent a wheel mechanism such as a gear from being damaged by an external shock (e.g., which is caused by a pet or an object drop) or a shock caused by autonomous vibration when the robot cleaner crosses over an obstacle.

The foregoing description illustrates and describes the present invention. Additionally, the disclosure shows and describes only the preferred embodiments of the present invention, but as mentioned above, it is to be understood that the present invention is capable of being used in various other combinations, modifications, and environments and is capable of being changed or modified within the scope of the inventive concept as expressed herein, commensurate with the above teaching and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A robot cleaner comprising:
a main body; and
a driving unit configured to move the main body, wherein the driving unit comprises:
a plurality of motors configured to generate driving forces;
a driving wheel configured to rotate when receiving a driving force transferred from any one of the plurality of motors; and
a wheel frame configured to rotatably support the driving wheel and configured to rotate to change a position of the driving wheel when receiving a driving force transferred from another one of the plurality of the motors,
wherein the plurality of motors comprises:
a first driving motor configured to rotate the driving wheel;
a second driving motor configured to rotate the wheel frame; and
a current sensor configured to measure an electric current flowing through the second driving motor and detect whether the driving wheel is in contact with a floor when the wheel frame rotates.

2. The robot cleaner of claim 1, further comprising:
a housing configured to fix the first driving motor and the second driving motor; and
an elastic member disposed between the housing and the wheel frame,
wherein the wheel frame is pressed by the elastic member to rotate while not receiving a driving force transferred from the second driving motor.

3. The robot cleaner of claim 2, wherein the wheel frame rotates between a first position and a second position with respect to a motor shaft of the first driving motor when receiving the driving force transferred from the second driving motor.

4. The robot cleaner of claim 3, wherein the wheel frame rotates between the first position and a third position between the first position and the second position when the wheel frame is pressed by the elastic member, and rotates between the third position and the second position when the wheel frame receives the driving force transferred from the second driving motor.

5. The robot cleaner of claim 4, wherein the driving unit comprises:
at least one first driving force transfer gear accommodated inside the wheel frame and configured to transfer a driving force of the first driving motor to the driving wheel; and
at least one second driving force transfer gear disposed between the second driving motor and the wheel frame and configured to transfer the driving force of the second driving motor to the wheel frame.

6. A robot cleaner comprising:
a main body;
a driving unit configured to move the main body, the driving unit including a driving wheel, a wheel frame configured to rotatably support the driving wheel, a first driving motor configured to generate a driving force for rotating the driving wheel, a second driving motor configured to generate a driving force for rotating the wheel frame, and an elastic member configured to press the wheel frame, and the elastic member and the second driving motor independently rotate the wheel frame;
an input unit configured to receive a command of the robot cleaner;
a current sensor configured to measure an electric current flowing through the second driving motor when the robot cleaner travels according to the received command; and
a controller configured to determine whether the robot cleaner is stuck using the electric current measured by the current sensor and control an output of the second driving motor to escape from being stuck when the robot cleaner is stuck,
wherein the controller detects a traction force between the driving wheel and a floor using the electric current measured by the current sensor when the wheel frame rotates.

7. The robot cleaner of claim 6, wherein the controller determines that the robot cleaner is lifted and thus stuck when the electric current measured by the current sensor decreases to below a certain electric current, and increases the output of the second driving motor to rotate the wheel frame between a third position and a second position when the robot cleaner is lifted and thus stuck.

8. The robot cleaner of claim 7, wherein the controller changes a position of the driving wheel between a first drop position and a second drop position when the wheel frame rotates between the third position and the second position.

9. The robot cleaner of claim 6, wherein the controller determines that the driving wheel is in contact with the floor when the electric current measured by the current sensor increases to above a certain electric current, and stops driving the second driving motor when the driving wheel is in contact with the floor.

10. The robot cleaner of claim 6, further comprising:
an encoder configured to measure a movement of the driving unit that moves according to the received command; and
a position sensor configured to measure a movement of the robot cleaner,
wherein the controller determines a travel state of the robot cleaner using a position value obtained by the received command, a position value obtained by calculating a movement position of the robot cleaner according to the measured value of the encoder, and a position value obtained by calculating a movement position of the robot cleaner according to sensor information of the robot cleaner.

11. The robot cleaner of claim 10, further comprising a tilt sensor configured to measure a tilt of the robot cleaner,
wherein the controller calculates a movement angle of the robot cleaner according to the measured value of the encoder, measures a movement angle of the robot cleaner according to sensor information of the tilt sensor, and determines the travel state of the robot cleaner using the calculated angle of the robot cleaner and the measured angle of the robot cleaner.

12. A control method of a robot cleaner including a driving unit, the driving unit including a driving wheel, a wheel frame configured to rotatably support the driving wheel, a first driving motor configured to generate a driving force for rotating the driving wheel so that, when the driving wheel contacts a surface, the rotation of the driving wheel causes the robot cleaner to move along the surface, and a second driving motor configured to generate a driving force for rotating the wheel frame, the control method comprising:
measuring, by a current sensor of the robot cleaner, an electric current flowing through the second driving motor;
determining, using the measured electric current, whether the driving wheel is lifted from the surface, and thereby no longer contacting the surface, due to the robot cleaner being stuck; and
when it is determined that the driving wheel is lifted from the surface, increasing the driving force generated by the second driving motor to rotate the wheel frame so that the driving wheel is lowered to contact the surface and thereby escape the robot cleaner from being stuck.

13. A wheel frame installed in a robot cleaner and configured to rotatably support a driving wheel of the robot cleaner, the wheel frame comprising:
a gear accommodation part provided inside the wheel frame;
first driving force transfer gears accommodated in the gear accommodation part and configured to transfer a driving force of a first driving motor for rotating the driving wheel to the driving wheel;
second driving force transfer gears configured to transfer a driving force of a second driving motor for rotating the wheel frame to the wheel frame;
a support frame configured to rotatably support the second driving force transfer gears; and
a driving wheel provided outside the wheel frame and configured to receive the driving force transferred from the second driving force transfer gears.

14. The wheel frame of claim 13, wherein the second driving force transfer gears comprise:
a motor shaft gear configured to engage with a motor shaft of the second driving motor;
a tilt gear disposed to engage with a driving gear; and
at least one connection gear disposed between the motor shaft gear and the tilt gear and configured to transfer a driving force.

* * * * *